US008620933B2

(12) United States Patent
Holmes et al.

(10) Patent No.: US 8,620,933 B2
(45) Date of Patent: Dec. 31, 2013

(54) ILLUSTRATING CROSS CHANNEL CONVERSION PATHS

(75) Inventors: Laura Holmes, San Francsico, CA (US); Cody Cai, Mountain View, CA (US); Leo Baghdassarian, Mountain View, CA (US); Sissie Ling-Ie Hsiao, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 313 days.

(21) Appl. No.: 13/084,546

(22) Filed: Apr. 11, 2011

(65) Prior Publication Data

US 2012/0259871 A1    Oct. 11, 2012

(51) Int. Cl.
*G06F 17/30* (2006.01)
*G06F 7/00* (2006.01)

(52) U.S. Cl.
USPC .......................................... 707/752; 707/760

(58) Field of Classification Search
USPC ......................................................... 707/752
See application file for complete search history.

(56) References Cited

U.S. PATENT DOCUMENTS

| | | | | |
|---|---|---|---|---|
| 6,148,333 | A * | 11/2000 | Guedalia et al. | 709/219 |
| 6,701,318 | B2 | 3/2004 | Fox et al. | |
| 6,839,680 | B1 | 1/2005 | Liu et al. | |
| 7,363,302 | B2 * | 4/2008 | Lester | 725/42 |
| 7,523,191 | B1 * | 4/2009 | Thomas et al. | 709/224 |
| 7,668,726 | B2 | 2/2010 | Cardno et al. | |
| 7,917,382 | B2 | 3/2011 | Cereghini et al. | |
| 8,259,722 | B1 * | 9/2012 | Kharitonov | 370/392 |
| 2003/0025696 | A1 * | 2/2003 | Mulgan | 345/440 |
| 2004/0043764 | A1 * | 3/2004 | Bigham et al. | 455/422.1 |
| 2004/0085362 | A1 | 5/2004 | Sauermann et al. | |
| 2005/0131762 | A1 | 6/2005 | Bharat et al. | |
| 2005/0182676 | A1 * | 8/2005 | Chan | 705/14 |
| 2006/0132507 | A1 * | 6/2006 | Wang | 345/660 |
| 2006/0212350 | A1 | 9/2006 | Ellis et al. | |
| 2006/0216683 | A1 | 9/2006 | Goradia | |
| 2006/0218035 | A1 | 9/2006 | Park et al. | |
| 2006/0277211 | A1 | 12/2006 | Error | |

(Continued)

FOREIGN PATENT DOCUMENTS

| | | |
|---|---|---|
| JP | 2005-196675 | 7/2005 |
| KR | 10-2007-27759 | 3/2007 |

(Continued)

OTHER PUBLICATIONS

International Search Report and Written Opinion for PCT/US2011/054069, mail date May 16, 2012, 17 pages.

(Continued)

*Primary Examiner* — Pavan Mamillapalli
(74) *Attorney, Agent, or Firm* — Foley & Lardner LLP; John D. Lanza

(57) ABSTRACT

Methods, systems, and apparatuses, including computer programs encoded on computer readable media, for generating Venn-like diagram illustrating cross channel conversion paths. In one aspect, a plurality of conversion paths are received. Each conversion path includes one or more user interactions that include a plurality of dimensional data. A sorted list of channel groups that includes one or more group rules is received and each user interaction is grouped into a channel based upon the channel groups. A selection of channels to visualize is received and an image including one circle for each selected channel is generated. The circles are optimally placed to maximize the accuracy of the overlapped regions with channel group data.

20 Claims, 15 Drawing Sheets

(56) References Cited

U.S. PATENT DOCUMENTS

| | | | |
|---|---|---|---|
| 2007/0027768 A1* | 2/2007 | Collins et al. ............ | 705/14 |
| 2007/0044133 A1 | 2/2007 | Hodecker | |
| 2008/0046218 A1 | 2/2008 | Dontcheva et al. | |
| 2008/0162699 A1 | 7/2008 | Gaffney | |
| 2008/0172271 A1 | 7/2008 | Wee et al. | |
| 2008/0215633 A1 | 9/2008 | Dunkeld et al. | |
| 2009/0076886 A1 | 3/2009 | Dulitz et al. | |
| 2009/0106081 A1 | 4/2009 | Burgess et al. | |
| 2009/0192888 A1 | 7/2009 | Barton et al. | |
| 2009/0292677 A1 | 11/2009 | Kim | |
| 2010/0094704 A1 | 4/2010 | Subramanian et al. | |
| 2010/0306276 A1 | 12/2010 | Davis et al. | |
| 2011/0082858 A1 | 4/2011 | Yu et al. | |
| 2011/0191343 A1 | 8/2011 | Heaton et al. | |
| 2011/0307515 A1 | 12/2011 | Chen et al. | |
| 2012/0159637 A1 | 6/2012 | Dove et al. | |

FOREIGN PATENT DOCUMENTS

| | | |
|---|---|---|
| KR | 10-2007-56047 | 5/2007 |
| KR | 2007-0111647 | 11/2007 |
| KR | 10-2008-89616 | 10/2008 |
| KR | 10-2008-103605 | 11/2008 |
| KR | 10-2008-114804 | 12/2008 |
| KR | 10-2009-3377 | 1/2009 |
| KR | 2009-0090032 | 8/2009 |
| KR | 1009281980000 | 11/2009 |
| KR | 10-2010-101707 | 9/2010 |

OTHER PUBLICATIONS

"Diagrams," Stanford Encyclopedia of Philosophy, Section 3.1, http://plato.stanford.edu/entries/diagrams/, Aug. 28, 2001.
International Search Report and Written Opinion for PCT/US2011/053837, dated Sep. 26, 2012, 9 pages.
International Search Report and Written Opinion for PCT/US2011/053838, dated Feb. 27, 2012.
International Search Report and Written Opinion for PCT/US2011/053934, dated Aug. 29, 2012, 9 pages.
International Search Report and Written Opinion for PCT/US2011/053973 application, dated May 14, 2012.
International Search Report and Written Opinion for PCT/US2011/054000, date of mailing Apr. 19, 2012, 9 pages.
International Search Report and Written Opinion for PCT/US2011/054007, dated Aug. 28, 2012.
International Search Report and Written Opinion for PCT/US2011/054065, dated Apr. 19, 2012, 8 pages.
Office Action for U.S. Appl. No. 13/084,413 dated Aug. 9, 2012, 9 pages.
Office Action for U.S. Appl. No. 13/084,530 dated Aug. 13, 2012, 16 pages.
Office Action for U.S. Appl. No. 13/084,537 dated Aug. 14, 2012, 27 pages.
Office Action for U.S. Appl. No. 13/184,772 dated Jan. 29, 2013, 20 pages.
Office Action for U.S. Appl. No. 13/084,530 dated Mar. 5, 2013, 28 pages.
Office Action for U.S. Appl. No. 13/084,537 dated Mar. 8, 2013, 24 pages.

* cited by examiner

| Conversion Path (source / medium) | Conversions | Conversion Value |
|---|---|---|
| search engine / organic > direct / none > search engine / cpc | 16,889 | $27,058.57 |
| referral_url / referral > socialnet_url / cpc > spring newsletter / email | 11,055 | $10,988.57 |
| search engine / organic > direct / none > search engine / ppc | 9,094 | $11,596.74 |
| referral_url / referral > socialnet2_url / cpc > sale newsletter / email | 9,045 | $10,557.65 |
| search engine / organic | 9,023 | $13,201.68 |

FIG. 8A

ILLUSTRATING CROSS CHANNEL CONVERSION PATHS

BACKGROUND

The internet provides access to a wide variety of content. For instance, images, audio, video, and web pages for a myriad of different topics are accessible through the Internet. The accessible content provides an opportunity to place advertisements. Advertisements can be placed within content, such as a web page, image or video, or the content can trigger the display of one or more advertisements, such as presenting an advertisement in an advertisement slot.

Advertisers decide which ads are displayed within particular content using various advertising management tools. These tools also allow an advertiser to track the performance of various ads or ad campaigns. The parameters used to determine when to display a particular ad can also be changed using advertising management tools.

The data that is used to generate the performance measures for the advertiser generally includes all data that is available. This data usually includes a combination of data from multiple servers. The amount of the combined data is large enough that performance measures generated from the data can be used to provide an efficient way of understanding the data. Processing of the data to generate useful and accurate performance measures involves a number of obstacles. For instance, if a performance measure is based upon a user's actions over a period of time, the user's actions should be tracked. A cookie can be used to track a user's actions over a period of time. However, if this cookie is removed during the period of time, collection of accurate data tracking the user's actions may be disrupted. The data can contain record user actions that include various actions that are significant to an advertiser. These actions, which can be any recordable event, are called conversions. Identifying other actions that contribute to the occurrence of conversions is valuable. The data, however, contains numerous actions that could be associated with conversions. In addition, the data may also contain information regarding user actions that do not contribute to any recorded conversions. Thus, processing the data to provide accurate and reliable performance measures based upon all the available information regarding user actions has a number of challenges.

SUMMARY

In general, one innovative aspect of the subject matter described in this specification can be embodied in methods in which each conversion path includes one or more user interactions in chronological order. User interactions include a plurality of dimensional data that is related to the user interaction. Each conversion path corresponds to a single user and ends with a conversion interaction. A sorted list of channel groups that includes one or more group rules is received. The one or more group rules refer to one or more dimensional data. Each channel group includes a group name. Each user interaction in the plurality of conversion paths is grouped based upon the sorted list of channel groups. For each channel group, the number of conversion paths that include one or more user interaction that are grouped into each channel group is determined. A selection of channels to visualize is received. An image is generated that includes a plurality of circles. Each circles is associated with a selected channel and the area of each circle is proportional to the percentage of conversion paths that include one or more user interactions that are grouped into the selected channel. The area of overlap of all of the circles is proportional to the percentage of conversion paths that include user interactions from each selected channel.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

FIG. 8A illustrates portions of a report illustrating non-group conversion paths in accordance with an illustrative embodiment.

Like reference numbers and designations in the various drawings indicate like elements.

DETAILED DESCRIPTION

Content providers (e.g., advertisers) are provided various reports that disclose various user interactions with content. Each user interaction can include a number of dimensions, which can contain data associated with the user interaction. Reports can be generated to provide an advertiser with information regarding the user interactions. User interactions can include user interactions from various channels. Channels are a way to describe the originating source of a user interaction. Illustrative examples include clicking on a paid advertisement, directly navigating to a website, clicking on an organic search result, clicking on a link within an email, clicking on link from a referring website, clicking on a link from a social networking website, etc. Conversion paths include one or more user interactions that preceded a conversion user interaction. The user interactions in a conversion path can be grouped into one of the various channels. An image can be generated that illustrates a Venn-like diagram that represents the number or amount of conversion paths that include common channels.

As used throughout this document, user interactions include any presentation of content to a user and any subsequent affirmative actions or non-actions (collectively referred to as "actions" unless otherwise specified) that a user takes in response to presentation of content to the user (e.g., selections of the content following presentation of the content, or no selections of the content following the presentation of the content). Thus, a user interaction does not necessarily require a selection of the content (or any other affirmative action) by the user.

User interaction measures can include one or more of time lag measures (i.e., measures of time from one or more specified user interactions to a conversion), path length measures (i.e., quantities of user interactions that occurred prior to conversions), user interaction paths (i.e., sequences of user interactions that occurred prior to the conversion), assist interaction measures (i.e., quantities of particular user interactions that occurred prior to the conversion), and assisted conversion measures (i.e., quantities of conversions that were assisted by specified content).

Figure 1:
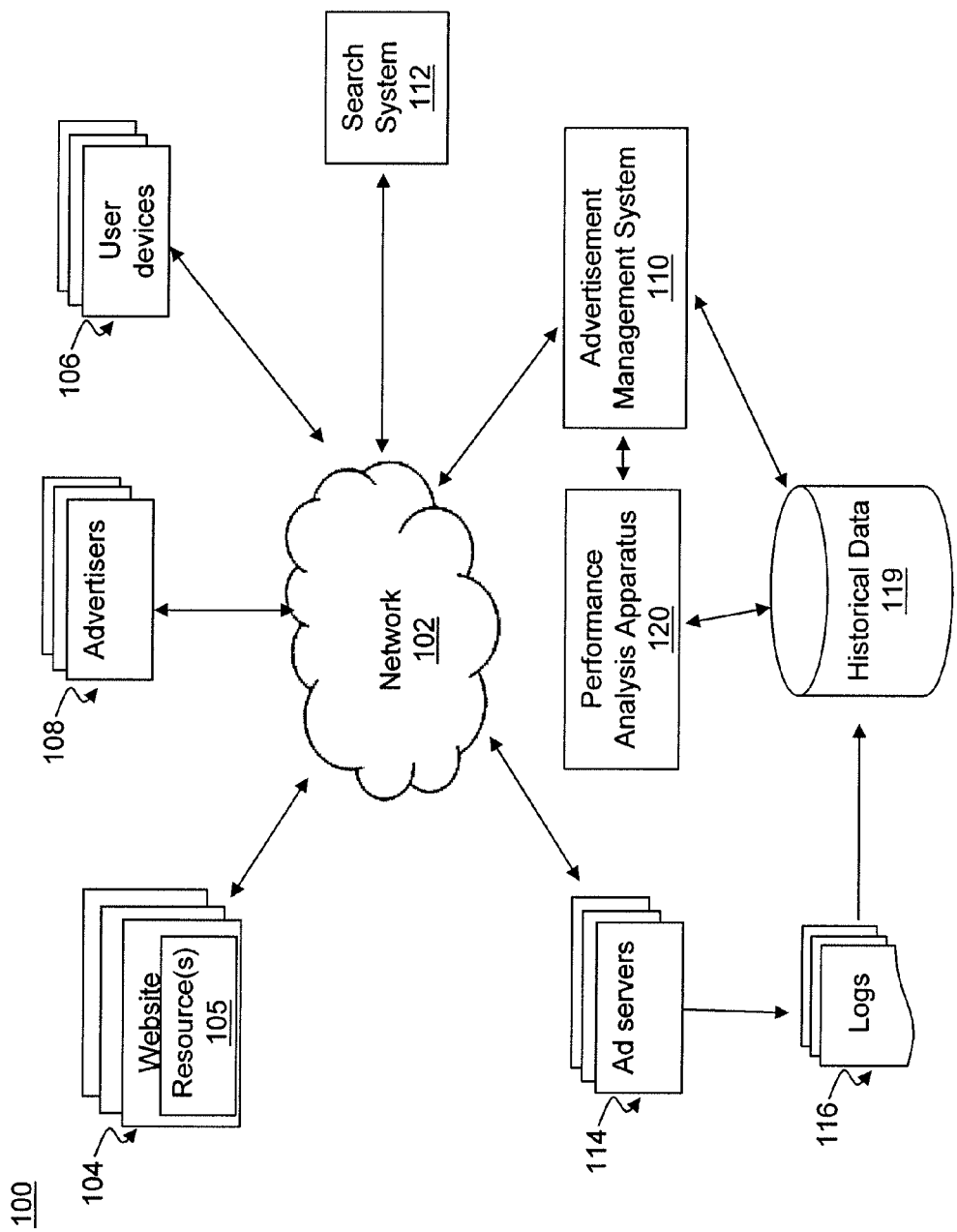
FIG. 1 is a block diagram of an example environment in which an advertisement management system manages advertising services in accordance with an illustrative embodiment.

FIG. 1 is a block diagram of an example environment in which an advertisement management system manages advertising services in accordance with an illustrative embodiment. The example environment 100 includes a network 102, such as a local area network (LAN), a wide area network (WAN), the Internet, or a combination thereof. The network 102 connects websites 104, user devices 106, advertisers 108, and an advertisement management system 110. The example environment 100 may include many thousands of websites 104, user devices 106, and advertisers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts.

A resource 105 is any data that can be provided over the network 102. A resource 105 is identified by a resource address that is associated with the resource 105, such as a uniform resource locator (URL). Resources 105 can include web pages, word processing documents, portable document format (PDF) documents, images, video, programming elements, interactive content, and feed sources, to name only a few. The resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages such as JavaScript® or ECMAScript®.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can include data specifying a portion of the resource or a portion of a user display (e.g., a presentation location of a pop-up window or in a slot of a web page) in which advertisements can be presented. These specified portions of the resource 105 or user display are referred to as advertisement slots.

To facilitate searching of the vast number of resources 105 accessible over the network 102, the environment 100 can include a search system 112 that identifies the resources 105 by crawling and indexing the resources 105 provided on the websites 104. Data about the resources 105 can be indexed based on the resource 105 with which the data is associated. The indexed and, optionally, cached copies of the resources 105 are stored in a search index (not shown).

User devices 106 can submit search queries to the search system 112 over the network 102. In response, the search system 112 accesses the search index to identify resources 105 that are relevant to the search query. In one illustrative embodiment, a search query includes one or more keywords. The search system 112 identifies the resources 105 that are responsive to the query, provides information about the resources 105 in the form of search results and returns the search results to the user devices 106 in search results pages. A search result can include data generated by the search system 112 that identifies a resource 105 that is responsive to a particular search query, and can include a link to the resource 105. An example search result can include a web page title, a snippet of text or a portion of an image extracted from the web page 104, a rendering of the resource 105, and the URL of the web page 104. Search results pages can also include one or more advertisement slots in which advertisements can be presented.

A search result page can be sent with a request from the search system 112 for the web browser of the user device 106 to set an HTTP (HyperText Transfer Protocol) cookie. A cookie can represent, for example, a particular user device 106 and a particular web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifier can be anonymized and is not connected with user names. Because HTTP is a stateless protocol, the use of cookies allows an external service, such as the search system 112 or other system, to track particular actions and status of a user over multiple sessions. A user may opt out of tracking user actions, for example, by disabling cookies in the browser's settings.

When a resource 105 or search results are requested by a user device 106 or provided to the user device 106, the advertisement management system 110 receives a request for advertisements to be provided with the resource 105 or search results. The request for advertisements can include characteristics of the advertisement slots that are defined for the requested resource 105 or search results page, and can be provided to the advertisement management system 110. For example, a reference (e.g., URL) to the resource 105 for which the advertisement slot is defined, a size of the advertisement slot, and/or media types that are available for presentation in the advertisement slot can be provided to the advertisement management system 110. Similarly, keywords (i.e., one or more words that are associated with content) associated with a requested resource 105 ("resource keywords") or a search query for which search results are requested can also be provided to the advertisement management system 110 to facilitate identification of advertisements that are relevant to the resource 105 or search query.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries. In some implementations, advertisements having targeting keywords that match the resource keywords, the search query, or portions of the search query are selected as eligible advertisements by the advertisement management system 110.

The advertisement management system 110 selects an eligible advertisement for each advertisement slot of a resource 105 or of a search results page. The resource 105 or search results page is received by the user device 106 for presentation by the user device 106. User interaction data representing user interactions with presented advertisements can be stored in a historical data store 119. For example, when an advertisement is presented to the user via an ad server 114, data can be stored in a log file 116. This log file 116, as more fully described below, can be aggregated with other data in the historical data store 119. Accordingly, the historical data store 119 contains data representing the advertisement impression. For example, the presentation of an advertisement is stored in response to a request for the advertisement that is presented. For example, the ad request can include data identifying a particular cookie, such that data identifying the cookie can be stored in association with data that identifies the advertisement(s) that were presented in response to the request. In some implementations, the data can be stored directly to the historical data store 119.

Similarly, when a user selects (i.e., clicks) a presented advertisement, data representing the selection of the advertisement can be stored in the log file 116, a cookie, or the historical data store 119. In some implementations, the data is stored in response to a request for a web page that is linked to by the advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 106.

The log files 116, or the historical data store 119, also store references to advertisements and data representing conditions under which each advertisement was selected for presentation to a user. For example, the historical data store 119 can store targeting keywords, bids, and other criteria with which eligible advertisements are selected for presentation. Additionally, the historical data store 119 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation.

The advertisers 108 can submit, to the advertisement management system 110, campaign parameters (e.g., targeting keywords and corresponding bids) that are used to control distribution of advertisements. The advertisers 108 can access the advertisement management system 110 to monitor performance of the advertisements that are distributed using the campaign parameters. For example, an advertiser can access a campaign performance report that provides a number of impressions (i.e., presentations), selections (i.e., clicks), and conversions that have been identified for the advertisements. The campaign performance report can also provide a total cost, a cost-per-click, and other cost measures for the advertisement over a specified period of time. For example, an advertiser may access a performance report that specifies that advertisements distributed using the phrase match keyword "hockey" have received 1,000 impressions (i.e., have been presented 1,000 times), have been selected (e.g., clicked) 20 times, and have been credited with 5 conversions. Thus, the phrase match keyword hockey can be attributed with 1,000 impressions, 20 clicks, and 5 conversions.

As described above, reports that are provided to a particular content provider can specify performance measures measuring user interactions with content that occur prior to a conversion. A conversion occurs when a user performs a specified action, and a conversion path includes a conversion and a set of user interactions occurring prior to the conversion by the user. Any user interaction or user interactions can be deemed a conversion. What constitutes a conversion may vary from case to case and can be determined in a variety of ways. For example, a conversion may occur when a user clicks on an advertisement, is referred to a web page or website, and then consummates a purchase there before leaving the web page or website. As another example, a conversion may occur when a user spends more than a given amount of time on a particular website. Data from multiple user interactions can be used to determine the amount of time at the particular website.

Actions that constitute a conversion can be specified by each advertiser. For example, each advertiser can select, as a conversion, one or more measurable/observable user actions such as, for example, downloading a white paper, navigating to at least a given depth of a website, viewing at least a certain number of web pages, spending at least a predetermined amount of time on a website or web page, or registering on a website. Other actions that constitute a conversion can also be used.

To track conversions (and other interactions with an advertiser's website), an advertiser can include, in the advertiser's web pages, embedded instructions that monitor user interactions (e.g., page selections, content item selections, and other interactions) with advertiser's website, and can detect a user interaction (or series of user interactions) that constitutes a conversion. In some implementations, when a user accesses a web page, or another resource, from a referring web page (or other resource), the referring web page (or other resource) for that interaction can be identified, for example, by execution of a snippet of code that is referenced by the web page that is being accessed and/or based on a URL that is used to access the web page.

For example, a user can access an advertiser's website by selecting a link presented on a web page, for example, as part of a promotional offer by an affiliate of the advertiser. This link can be associated with a URL that includes data (i.e., text) that uniquely identifies the resource from which the user is navigating. For example, the link http://www.example.com/homepage/% affiliate_identifier % promotion_1 specifies that the user navigated to the example.com web page from a web page of the affiliate that is associated with the affiliate identifier number that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to facilitate performance reporting.

When a conversion is detected for an advertiser, conversion data representing the conversion can be transmitted to a data processing apparatus ("analytics apparatus") that receives the conversion data, and in turn, stores the conversion data in a data store. This conversion data can be stored in association with one or more cookies for the user device that was used to perform the user interaction, such that user interaction data associated with the cookies can be associated with the conversion and used to generate a performance report for the conversion.

Typically, a conversion is attributed to a targeting keyword when an advertisement that is targeted using the targeted keyword is the last clicked advertisement prior to the conversion. For example, advertiser X may associate the keywords "tennis," "shoes," and "Brand-X" with advertisements. In this example, assume that a user submits a first search query for "tennis," the user is presented a search result page that includes advertiser X's advertisement, and the user selects the advertisement, but the user does not take an action that constitutes a conversion. Assume further that the user subsequently submits a second search query for "Brand-X," is presented with the advertiser X's advertisement, the user selects advertiser X's advertisement, and the user takes action that constitutes a conversion (e.g., the user purchases Brand-X tennis shoes). In this example, the keyword "Brand-X" will be credited with the conversion because the last advertisement selected prior to the conversion ("last selected advertisement") was an advertisement that was presented in response to the "Brand-X" being matched.

Providing conversion credit to the keyword that caused presentation of the last selected advertisement ("last selection credit") prior to a conversion is a useful measure of advertisement performance, but this measure alone does not provide advertisers with data that facilitates analysis of a conversion cycle that includes user exposure to, and/or selection of, advertisements prior to the last selected advertisement. For example, last selection credit measures alone do not specify keywords that may have increased brand or product awareness through presentation of advertisements that were presented to, and/or selected by, users prior to selection of the last selected advertisement. However, these advertisements may have contributed significantly to the user subsequently taking action that constituted a conversion.

In the example above, the keyword "tennis" is not provided any credit for the conversion, even though the advertisement that was presented in response to a search query matching the keyword "tennis" may have contributed to the user taking an action that constituted a conversion (e.g., making a purchase of Brand-X tennis shoes). For instance, upon user selection of the advertisement that was presented in response to the keyword "tennis" being matched, the user may have viewed Brand-X tennis shoes that were available from advertiser X. Based on the user's exposure to the Brand-X tennis shoes, the user may have subsequently submitted the search query "Brand-X" to find the tennis shoes from Brand-X. Similarly, the user's exposure to the advertisement that was targeted using the keyword "tennis," irrespective of the user's selection of the advertisement, may have also contributed to the user subsequently taking action that constituted a conversion (e.g., purchasing a product from advertiser X). Analysis of user interactions, with an advertiser's advertisements (or other content), that occur prior to selection of the last selected advertisement can enhance an advertiser's ability to understand the advertiser's conversion cycle.

A conversion cycle is a period that begins when a user is presented an advertisement and ends at a time at which the user takes action that constitutes a conversion. A conversion cycle can be measured and/or constrained by time or actions and can span multiple user sessions. User sessions are sets of user interactions that are grouped together for analysis. Each user session includes data representing user interactions that were performed by a particular user and within a session window (i.e., a specified period). The session window can be, for example, a specified period of time (e.g., 1 hour, 1 day, or 1 month) or can be delineated using specified actions. For example, a user search session can include user search queries and subsequent actions that occur over a 1 hour period and/or occur prior to a session ending event (e.g., closing of a search browser).

Analysis of a conversion cycle can enhance an advertiser's ability to understand how its customers interact with advertisements over a conversion cycle. For example, if an advertiser determines that, on average, an amount of time from a user's first exposure to an advertisement to a conversion is 20 days, the advertiser can use this data to infer an amount of time that users spend researching alternative sources prior to converting (i.e., taking actions that constitute a conversion). Similarly, if an advertiser determines that many of the users that convert do so after presentation of advertisements that are targeted using a particular keyword, the advertiser may want to increase the amount of money that it spends on advertisements distributed using that keyword and/or increase the quality of advertisements that are targeted using that particular keyword.

Measures of user interactions that facilitate analysis of a conversion cycle are referred to as conversion path performance measures. A conversion path is a set of user interactions by a particular user prior to and including a conversion by the particular user. Conversion path performance measures specify durations of conversion cycles, numbers of user interactions that occurred during conversion cycles, paths of user interactions that preceded a conversion, numbers of particular user interactions that occurred preceding conversions, as well as other measures of user interaction that occurred during conversion cycles, as described in more detail below.

The advertisement management system 110 includes a performance analysis apparatus 120 that determines conversion path performance measures that specify measures of user interactions with content items during conversion cycles. The performance analysis apparatus 120 tracks, for each advertiser, user interactions with advertisements that are provided by the advertiser, determines (i.e., computes) one or more conversion path performance measures, and provides data that cause presentation of a performance report specifying at least one of the conversion path performance measures. Using the performance report, the advertiser can analyze its conversion cycle, and learn how each of its keywords cause presentation of advertisements that facilitate conversions, irrespective of whether the keywords caused presentation of the last selected advertisement. In turn, the advertiser can adjust campaign parameters that control distribution of its advertisements based on the performance report.

Configuration options can be offered to reduce bias in performance reports. Without configuration options, some performance reports can be biased, such as towards short conversion paths. For example, a performance report can be biased towards short conversion paths if data used as a basis for the report includes a percentage of partial conversion paths which is higher than a threshold percentage. A partial conversion path is a conversion path in which some but not all user interaction data for a user is associated with a conversion. A partial conversion path can be included in a report if, for example, the report is generated using a reporting period which is less then the length of a typical conversion cycle for the advertiser who requested the report.

A reporting period determines the maximum length (in days) of a reported conversion cycle because additional data outside of the reporting period is not used to generate the report. A performance report can be based on a reporting period (i.e., lookback window), such that user interactions prior to the reporting period are not considered part of the conversion cycle when generating the report. Such a reporting period is referred to as a "lookback window". For example, when generating a report with a lookback window of thirty days, available user interaction data representing user actions that occurred between July 1 and July 31 of a given year would be available for a conversion that occurred on July 31 of that year.

If a default lookback window (e.g., thirty days) is used, the performance report can be biased towards short conversion paths if the typical conversion cycle length for a product associated with the report is greater than the default lookback window. For instance, in the example above, a typical conversion cycle for "Brand-X" tennis shoes may be relatively short (e.g., thirty days) as compared to a conversion cycle for a more expensive product, such as a new car. A new car may have a much longer conversion cycle (e.g., ninety days).

Different advertisers or different products for an advertiser can have different associated conversion cycle lengths. For example, an advertiser that sells low cost (e.g., less than $100) products may specify a lookback window of 30 days, while an advertiser that sells more expensive products (e.g., at least $1000) may specify a lookback window of 90 days.

In some implementations, an advertiser 108 can specify a lookback window to use when requesting a performance report, such as by entering a number of days or by selecting a lookback window from a list of specific lookback windows (e.g., thirty days, sixty days, ninety days). Allowing an advertiser to configure the lookback window of their performance reports enables the advertiser to choose a lookback window that corresponds to conversion cycles of their products. Allowing lookback window configuration also enables advertisers to experiment with different lookback windows, which can result in the discovery of ways to improve conversion rates.

Other factors can contribute to reporting on partial conversion paths. For example, as mentioned above, user interaction data used as a basis for a report can be associated with unique identifiers that represent a user device with which the user interactions were performed. As described above, a unique identifier can be stored as a cookie. Cookies can be deleted from user devices, such as by a user deleting cookies, a browser deleting cookies (e.g., upon browser exit, based on a browser preference setting), or some other software (e.g., anti-spyware software) deleting cookies.

If cookies are deleted from a user device, a new cookie will be set on the user's device when the user visits a web page (e.g., the search system 112). The new cookie may be used to store a new quasi-unique identifier, and thus subsequent user interaction data that occurs on the user device may be associated with a different identifier. Therefore, because each user identifier is considered to represent a different user, the user interaction data associated with the deleted cookies are identified as being associated with a different user than the user interaction data that is associated with the new cookies.

For instance, in the example above, assume that the user deletes cookies after the first search query for "tennis" is performed and that the second search query for "Brand-X" occurs after the cookies are deleted. In this example, performance measures computed based on the user interaction data for the user can show a bias. For example, a path length measure can be computed as one, rather than two, since the advertisement selection resulting from the first search query is not considered part of the same conversion cycle as the advertisement selection resulting from the second search query, since the two user interactions do not appear to have been performed by the same user.

To view a report which reduces bias caused from partial conversion paths, an advertiser can specify a lookback window for the report. As described above, the lookback window specifies that the user interaction data used to generate the report are user interaction data that are associated with unique identifiers that have initialization times that are prior to a specified period (e.g., thirty days, sixty days, ninety days) before the conversions. Thus, conversions for which user interaction data that are associated with unique identifiers having initialization times that are after the specified period are excluded from inclusion as a basis for the report. A unique identifier that has a recent initialization time indicates that the unique identifier may have been recently reinitialized on the user device that the unique identifier represents. Accordingly, user interaction data associated with the relatively new unique identifier may represent only a partial conversion path. Alternatively, conversions for which user interaction data that are associated with unique identifiers having initialization times that are after the specified period are included in the report. To reduce bias, any user interaction included in the conversion path that occurred after the specified period are removed from the conversion path prior to being included in the report.

Figure 2:
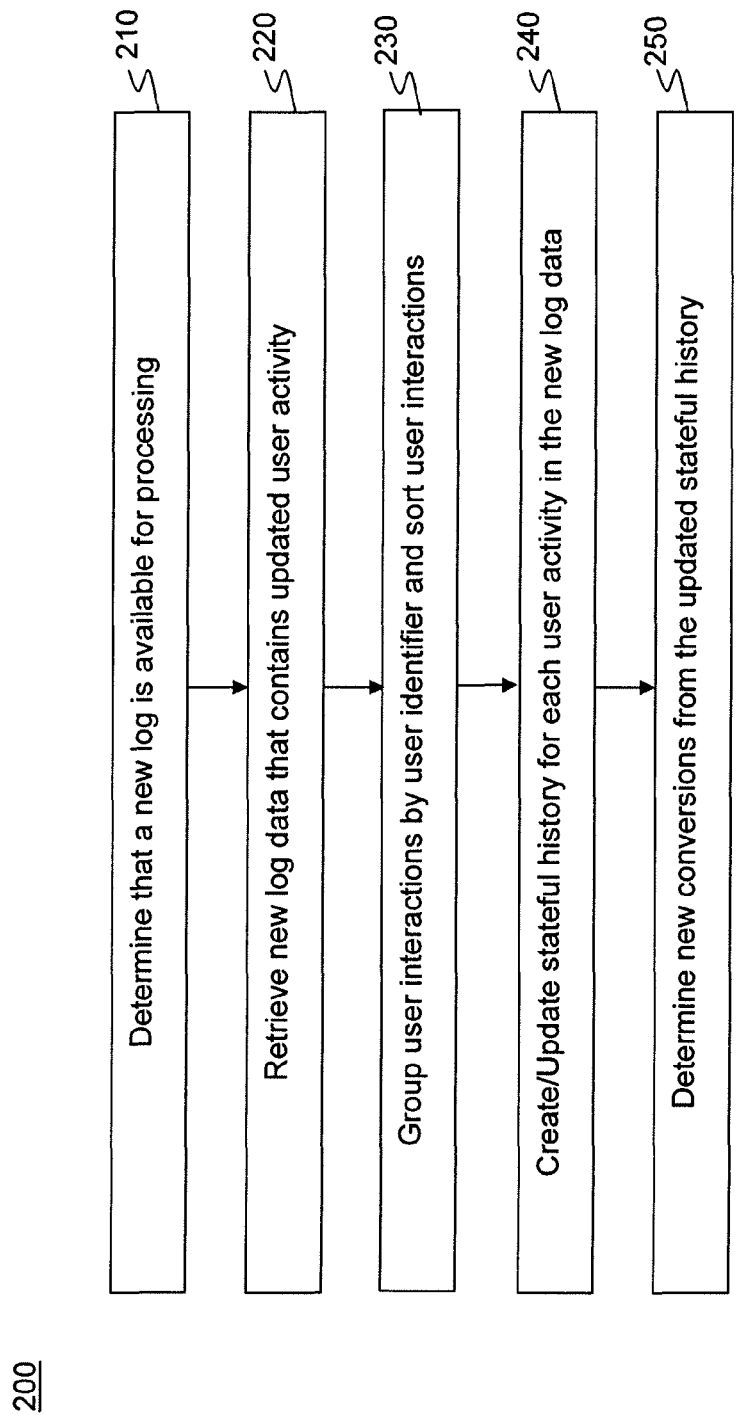
FIG. 2 is a flow diagram of a process for integrating user interaction log data in accordance with an illustrative embodiment.

FIG. 2 is a flow diagram of a process for integrating user interaction log data in accordance with an illustrative embodiment. The process 200 is a process that updates conversion paths and determines conversions based upon the updated conversion paths of users.

The process 200 can be implemented on the advertisement management system 110, the performance analysis apparatus 120, or another computing device. In one implementation, the process 200 is encoded on a computer-readable medium that contains instructions that when executed by a computing device cause the computing device to perform operations of process 200.

As described above, log files 116 may contain user interaction data. A log file 116 may be combined with user interaction data from other logs from other servers, including those that implement the search system 112, prior to processing. Processing starts with the computing device that implements the process 200 determining that a new log is available for processing (210). For example, a notification can be sent to the computing device indicating that a new log is ready for processing, or the existence of a new log can indicate that the new log is ready for processing.

Figure 3:
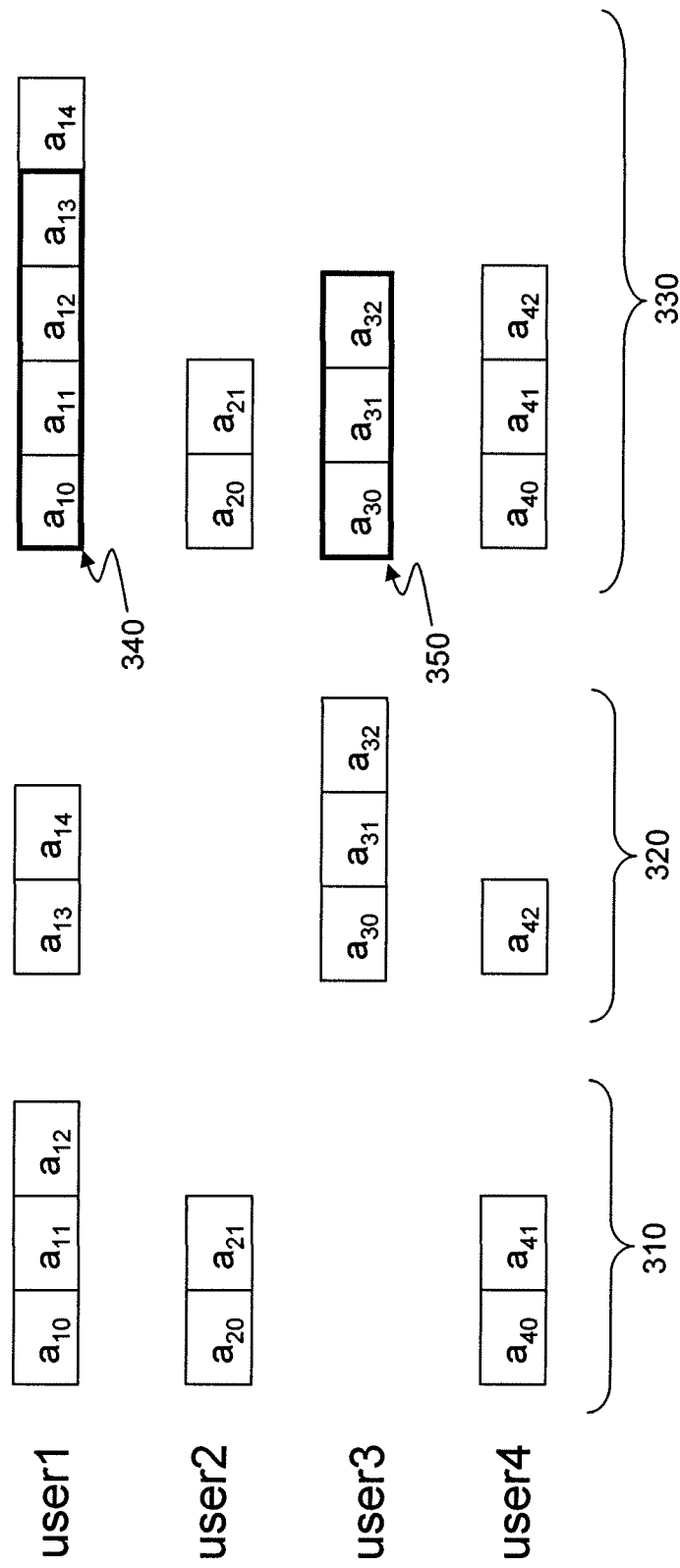
FIG. 3 is a block diagram that illustrates user interaction data being updated during a user interaction log data integration process in accordance with an illustrative embodiment.

Next, the new log is retrieved (220). The new log may be retrieved over the network 102. The stateful history for each user is updated based upon the user activity indicated by the new log. The new log can contain information relating to user interactions for numerous users. The historical data store 119 contains user interaction data from previously processed log files. The user interaction data contained within the historical data store 119 can be stateful, in that the user interaction data can be grouped by user identifier and ordered chronologically. FIG. 3 is a block diagram that illustrates user interaction data being updated during a user interaction log data integration process 200 in accordance with an illustrative embodiment. FIG. 3 illustrates four example user identifiers, although the historical data store 119 and log files 116 can contain data associated with thousands or millions of different user identifiers. In one embodiment, previously stored user interaction data 310 are stored in the historical data store 119. As illustrated, no user interaction data associated with user identifier 3 has been previously stored in the historical data store 119.

The new log can contain user interaction data for one or more user identifiers. The user interaction data can be grouped by user identifiers and then sorted chronologically (230). Column 320 illustrates grouped and sorted user interaction data. As illustrated, user identifier 2 does not include any new user interaction data, and user identifiers 1, 3, and 4 have updated user interaction data. For instance, the new log file includes user interaction data associated with user interactions $a_{13}$ and $a_{14}$ that are associated with user identifier 1. The grouped and sorted user interaction data can then merged with the user interaction data stored in the historical data store 119 (240). If a user identifier previously existed in the historical data store 119, the new user interaction data are added to the previous user interaction data. Otherwise, the new user interaction data is added with a new user identifier.

Column 330 illustrates the updated user interaction data for each of the user identifiers. Based upon the updated user interaction data, any conversions that occurred in each of the updated paths of user interactions can be determined (250). User interaction paths are constrained to those user interactions that are related to a particular advertiser 108. The conversion interactions of the particular advertiser 108 are used to determine if a conversion has occurred. As an example, assume that user interactions $a_{13}$ and $a_{32}$ represent conversion interactions. Accordingly, conversion paths 340 and 350 are found. Once found, the conversion paths can be written to another portion of the historical data store 119 or another data store for further analysis.

Each user interaction includes a set of data or dimensions associated with the user interaction. The dimensions can be sparsely populated, such that, any user interaction may have data relating to a subset of the dimensions. A large number of conversion paths can be generated based upon received user interaction data. Various reports regarding how a campaign or an advertiser's placements are performing can include various information regarding the conversion paths. Given the large potential number of conversion paths, various conversion paths can be grouped together to reduce the number of distinct conversion paths that are reported. In an illustrative embodiment, conversion paths that have the same number of user interactions and have corresponding data can be aggregated.

In one embodiment, users are able to create various groups to classify individual user interactions. A group includes a group definition that includes one or more group rules that determine if a particular user interaction belongs to a particular group. The group rules use the dimensional data of the user interaction to determine the group of a user interaction. Boolean operators such as AND, NOT, OR, etc. can be used to join various group rules in a group definition. Each group also includes a group name. In some embodiments, a group can include display information, such as, but not limited to, a text color and/or background color used to display the group name. Default groups may also be available to users. When default groups are available, a user can copy a default group, including the associated group rules, and then modify one or more of the group rules and/or the group name. User created groups can be stored in a data store, such as a local or remote database. The groups can then be accessed, modified, or deleted at a later time.

One or more groups can be associated with one another in a sorted or ordered list of grouping definitions. The groups within the ordered list are used to determine the group for each user interaction. The ordering of the list determines the priority of a particular group. A user interaction is grouped with the matching group that has the highest priority. A matching group of a lower priority will be ignored.

Using the ordered list of grouping definitions, each conversion path can be converted into a group path. A group path contains group elements that correspond to the user interactions of a conversion path. The group element can contain or reference data from the corresponding user interaction. In addition, the group element contains or references the group name and display information of the matching group.

In one embodiment, conversion paths are converted into group paths by adding a reference to the matching group to each of the user interactions. In another embodiment, group paths that are separate from the conversion paths are created. In this embodiment, the group paths can be stored in the same or in a different location from the location where the conversion paths are stored. Regardless of how the group paths are implemented, the group paths can be aggregated based upon the length of the group path and the group name of the group elements that make up the group path.

In one embodiment, the group paths contain various data from the corresponding conversion path. For example, a conversion path can include a monetary value associated with the conversion. As the group paths are aggregated, the value of all conversion paths associated with the aggregated group paths can also be aggregated. This aggregated value can be included in a report.

Figure 4:
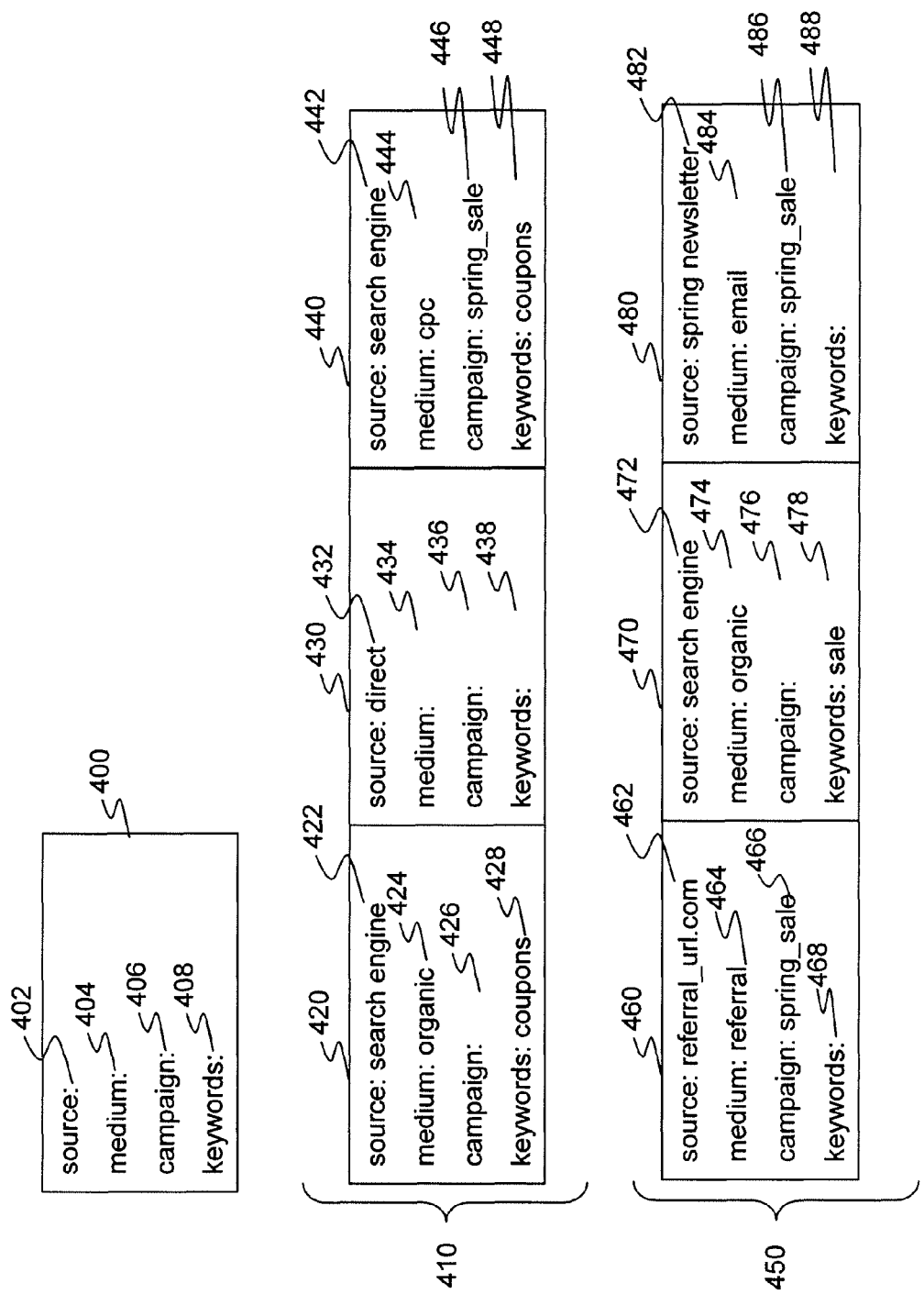
FIG. 4 is a block diagram that illustrates data associated with user interactions in accordance with an illustrative embodiment.

FIG. 4 is a block diagram that illustrates data associated with user interactions in accordance with an illustrative embodiment. A shell or form user interaction 400 illustrates four possible dimensions that can be associated with any user interaction. As illustrated, each user interaction can have a dimension related to a user interaction's source 402, medium 404, campaign 406, and keywords 408. The source dimension 402 indicates the source of a referral to a website. The medium dimension 404 provides further information regarding the source dimension 402. For instance, the source dimension 402 can indicate a particular search engine as the referring source, and the medium dimension 404 can further classify the source as being "cost-per-click" if the user clicked on a sponsored link or "organic" if the user clicked on an unpaid search results link. Other non-limiting examples of medium values include email, RSS feed, etc. The campaign dimension 406 allows an advertiser to differentiate between various advertising campaigns. For example, an advertiser may have two concurrently running advertising campaigns that refer users to one or more common page(s). The campaign dimension 406 allows the various user interactions related to the campaigns to be separated from one another. This gives an advertiser the ability to analyze the campaigns independently of one another, even though both campaigns drive users to the same common pages. The keyword dimension 408 contains any word or phrase the user used in a search. The available dimensions are not limited to these examples. For example, the dimensions relating to a user interaction can include, but are not limited to, an advertising network type, a date of the user interaction, a time of the user interaction, country/territory, landing page title, browser name, browser version, content, etc. For example, a user interaction can include a content dimension that allows an advertiser to indicate a version of the advertisement that the user clicked.

Conversion path 410 illustrates three user interactions 420, 430, and 440. User interaction 420 has dimensional data associated with the source dimension 422, the medium dimension 424, and the keywords dimension 428. The campaign dimension 426, however, has no associated data. In an illustrative embodiment, the user interaction 420 can be associated with a user searching using the keyword "coupon" in a search engine. The unpaid search results contain a link to the advertiser's website, which the user clicked upon. User interaction 430 provides an example of a user interaction whose dimensions are sparsely populated. Only the source dimension 432 has associated data. The remaining dimensions, 434, 436, and 438 do not have any associated dimensional data. User interaction 430 can correspond to, but is not limited to, a user visiting an advertiser's web page by typing the advertiser's web page address or URL directly into an address tool of a web browser. The third user interaction 440 in the conversion path 410 has all of the illustrated dimensions 442, 444, 446, and 448 populated with dimensional data. User interaction 440 can be associated with, but is not limited to, a user clicking on an advertising link that directs the user to the advertiser's web page. The advertising link is associated with the search results of a keyword search using "coupons" as the keyword in the search engine. Finally, the campaign dimension 446 indicates that the clicked advertising link corresponds to a "spring_sale" campaign.

Conversion path 450 illustrates another conversion path that includes three user interactions 460, 470, and 480. User interaction 460 has dimensional data associated with the source dimension 462, the medium dimension 464, and the campaign dimension 466. The keywords dimension 468 does not have any associated data. The medium dimension 464 indicates that a user was referred to an advertiser's web page based upon the referral_url web page based upon the source dimension 462. The keywords dimension 468 being empty can signify that a user did not do a keyword search associated with the referring site to navigate to the advertiser's web page. A user interaction 470 has dimensional data associated with the source dimension 472, and the medium dimension 474. Neither the campaign dimension 476 nor the keywords dimension has associated data. In an illustrative embodiment, the user interaction 470 can correspond to a user visiting an advertiser's web page by clicking on a paid advertising link that was displayed on the social networking site located at socialnet_url. User interaction 480 can be associated with a newsletter than contains a link to the advertiser's web page. The medium dimension 484 is set to "email" and indicates that the user navigated to the advertiser's web page from an email newsletter that corresponds to the "spring newsletter," based upon the source dimension 482. User interaction 480 also is related to the "spring_sale" campaign as indicated by the campaign dimension 486.

Conversion paths 410 and 450 are two illustrative conversion paths. An advertiser is likely to have a significantly larger number of conversion paths. Individual conversion paths can also include fewer or more user interactions than those illustrated in FIG. 4, and fewer or more dimensions. Given the number of conversion paths for a particular advertiser, reporting on each individual conversion path can be overwhelming. To provide useful reporting metrics, the multitude of conversion paths can be aggregated together before a report is generated. Prior to such aggregation, however, the conversion paths can be filtered based upon various criteria. For instance, the conversion paths can be filtered by, but not limited to, conversion path length, time lag measurements, source dimension, medium dimension, campaign dimension, keywords dimension, any other user interaction dimension, etc. User interactions can also be grouped into various groups prior to the aggregation of the conversion paths. Aggregation can be based upon a user interaction's group instead of directly based upon dimensional data of the user interaction. Groups can include one or more group rules that are used to determine if a user interaction matches the group. Numerous groups can be defined and sorted lists of the grouping definitions can be created.

Figure 5:
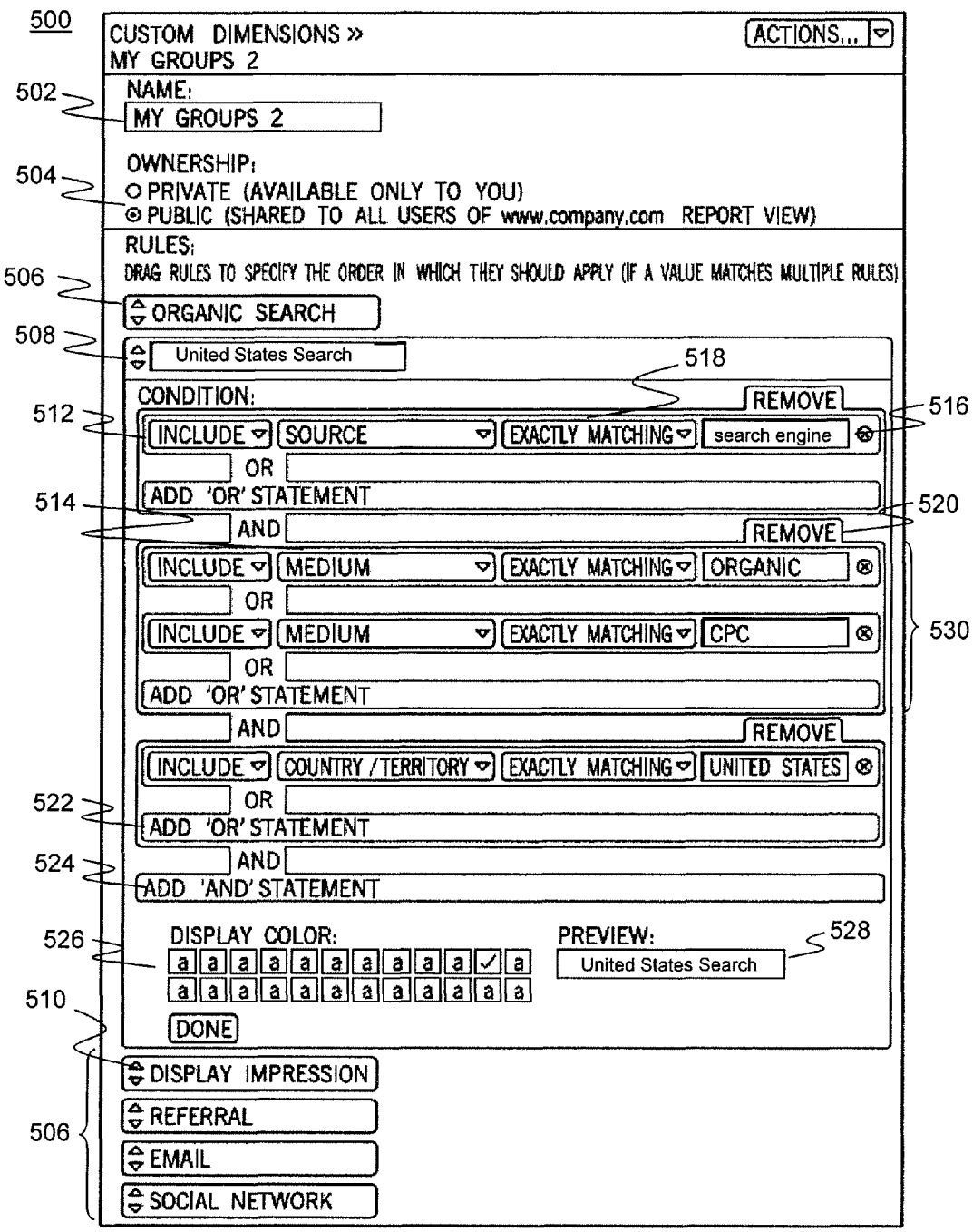
FIG. 5 is an illustrative user interface for creating group rules in accordance with an illustrative embodiment.

FIG. 5 is an illustrative user interface for creating groups in accordance with an illustrative embodiment. User interface 500 allows one or more groups to be defined as a sorted list of grouping definitions. The sorted list of grouping definitions can have a name, which can be entered using a text box 502. The sorted list can be private to a particular user or may be shared with others. For instance, a sorted list of grouping definitions can be shared with all users of a particular company or organization. In one embodiment, radio buttons 504 can be used to determine privacy of the sorted list of grouping definitions. User interface 500 illustrates a number of groups 506. Each group has a name that can be edited by a user. A user can edit the group name to be descriptive of the group rules, such as "United States Search." Editing of the group name can be accomplished through the user interface 500 by using a text box, such as text box 508.

In addition to a name, each group is associated with one or more group rules. The group rules can be hidden or displayed for each group. For instance, the group rules for the groups "Organic Search," "Display Impression," "Referral," "Email," and "Social Network" are hidden in the user interface 500. The rules for the group "United States Search," however, are visible. Rules can be hidden or made visible by user interface features such as a clickable icon or icons 510. Each group rule is applied to the dimensional data of a user interaction. The combination of all of the group rules for a particular group determines if the user interaction will be included in the particular group. Based upon the results of the various group rules, an individual rule can either include or exclude a particular user interaction. An include/exclude selector, such as a dropdown box 512, can be used. Rules that exclude user interactions, will have an output that is the opposite of an include rule with the same dimension, operation, and value. The various outcomes of the rules can be combined together using Boolean operators to determine if a user interaction belongs to a particular group.

An individual group rule has a number of configurable options, in addition to the include/exclude option. Each rule is associated with one or more dimensions of user interactions. A dropdown box 514 can be used to select the one or more dimensions, such as the medium dimension. The dimensional data based upon the selected one or more dimensions can then be applied to user supplied data. For example, user supplied data can be entered in a textbox. Text box 516 illustrates an example where the source of a user interaction is compared to the string "search engine." Various operations can be performed between the dimensional data and the user provided data. For example, operations can include, but are not limited to, matches, does not match, exactly matches, does not exactly match, starts with, does not start with, ends with, does not end with, etc. The operation can be selected using a drown box 518. The various configurable options of the group rules can be edited by the user using the various user interface components.

For each user interaction that a particular rule is applied to, the selected dimensional data is compared to the user provided data based upon the selected operation. A true or false value is generated for each rule. The various values of all of the group rules for a particular group are then evaluated based upon the selected Boolean operators. The end result is that the user interaction is either included in the particular group or is not included in the particular group. Buttons 522 and 524 can be used to add new rules that are joined to existing rules by a Boolean OR or AND statement, respectively.

Individual group rules can be removed using the user interface 500. For example, button 516 can be used to remove a group rule. Similarly, tab 520 can be used to remove the two group rules 530 that are connected by a Boolean OR. Additionally, entire groups can be removed by dragging a group name to a delete icon (not shown) or by selecting a delete group button (not shown). Additional groups can also be added by selecting an add new rule button (not shown).

If a user interaction matches a particular group, the user interaction can be visualized based upon display information associated with the group. Display information can include, but is not limited to, a font color and a background color. Buttons 526 can be used to select the font color and/or the background used to display the group name. How the group name will display can be previewed in text area 528.

The order of the groups determines the priority of the groups and the order in which the groups will be applied to the user interaction. The first matching group will determine a user interaction's group, even if subsequent groups would also match the user interaction. The order of the groups can be changed by dragging and dropping a group from one position to another position in the user interface 500. If no rule matches a particular user interaction, a default rule can be provided. The default rule can display dimensional data from the user interaction or can display a user defined group name of the default rule. Once the group rules are appropriately set up, the rules can be saved to a local or remote data store for later use.

Figure 6:
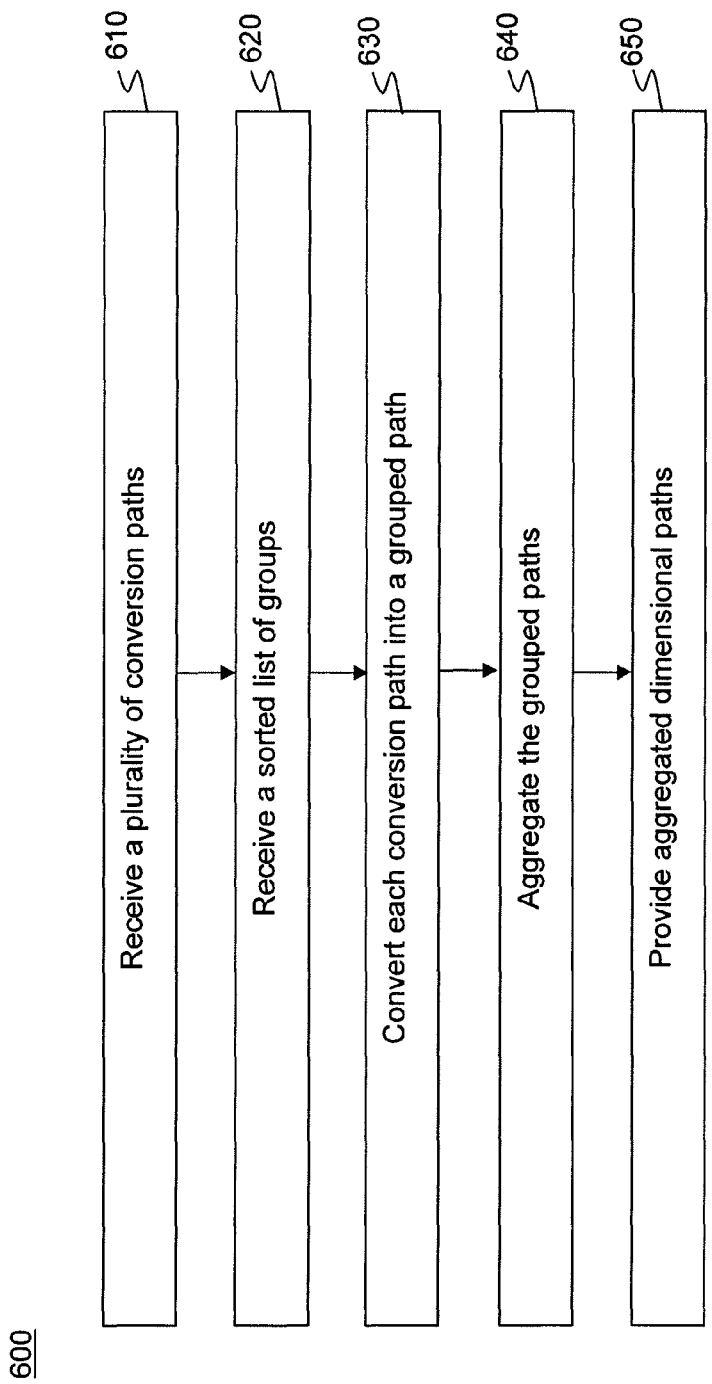
FIG. 6 is a flow diagram of a process for converting conversion paths into group paths in accordance with an illustrative embodiment.

In an illustrative embodiment, the group rules are used to generate a report based upon the grouping of user interactions that are in a set of conversion paths. For each conversion path that is to be included in the report, the conversion paths can be converted into a group path. FIG. 6 is a flow diagram of a process for converting conversion paths into group paths in accordance with an illustrative embodiment. The process 600 can be implemented on the advertisement management system 110, the performance analysis apparatus 120, or another computing device. In one implementation, the process 600 is encoded on a computer-readable medium that contains instructions that when executed by a computing device cause the computing device to perform operations of process 500.

A selection of conversion paths is retrieved from a data store, such as the historical data store 119 (610). The selection of conversion paths can include filtering of unwanted conversion paths such as those that appear to be invalid or do not meet some initial search criteria, such as retrieving all conversion paths that have conversions in the past 30 days. A sorted list of grouping definitions is also received (620). As there can be multiple sorted lists of grouping definitions, the received sorted list of grouping definitions can be based upon a user selection from the multiple sorted lists. The conversion paths next are converted into group paths (630). A group path is created for each of the received conversion paths. Each group path includes one or more group elements that correspond to the user interactions of the corresponding conversion path. A group element is created from a user interaction by applying the group rules to the user interaction. The group element is created based upon the first matching group from the sorted list of grouping definitions. The first matching group is the first group whose groups rules match the corresponding user interaction's dimensional data. The group element can include the group's name and any display information that can be used to display the group name. The group paths can then be aggregated together (640). In one embodiment, the group paths are aggregated based upon the length of the group paths and the group name of the group elements. The aggregated group paths can then be provided (650), for example, to a requesting user or including the aggregated group paths in a report.

Figure 7A:
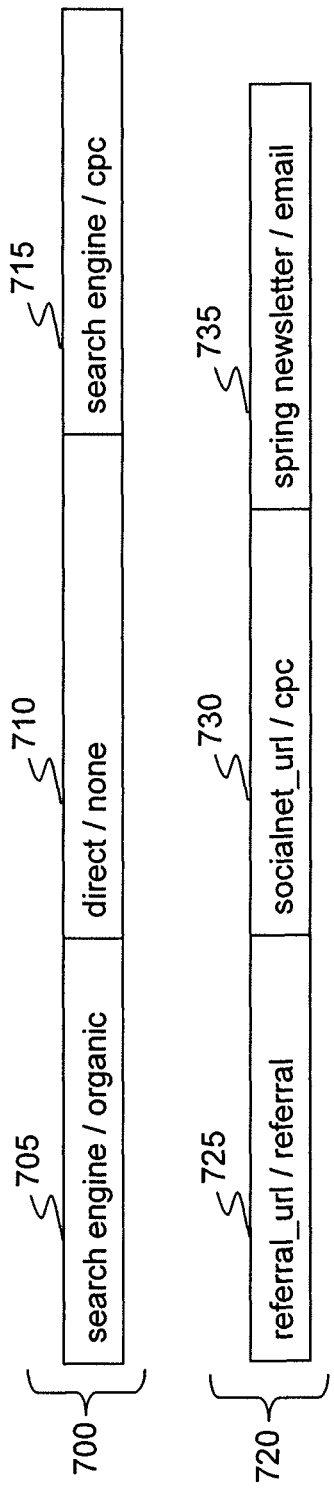
FIG. 7A is a block diagram that illustrates a non-group conversion path in accordance with an illustrative embodiment.

FIG. 7A is a block diagram that illustrates a non-group conversion path in accordance with an illustrative embodiment. FIG. 7A illustrates conversion paths 700 and 720 that correspond to conversion paths 410 and 450, respectively. Conversion paths 700 and 720 only illustrate the source and medium dimensions, and can be incorporated into a report. When aggregating non-group conversion paths, conversion paths that a user would logically group together may be reported as two independent conversion paths. Non-group conversion paths can increase the difficulty in analyzing conversion path data, as related data is reported in separate rows.

Figure 7B:
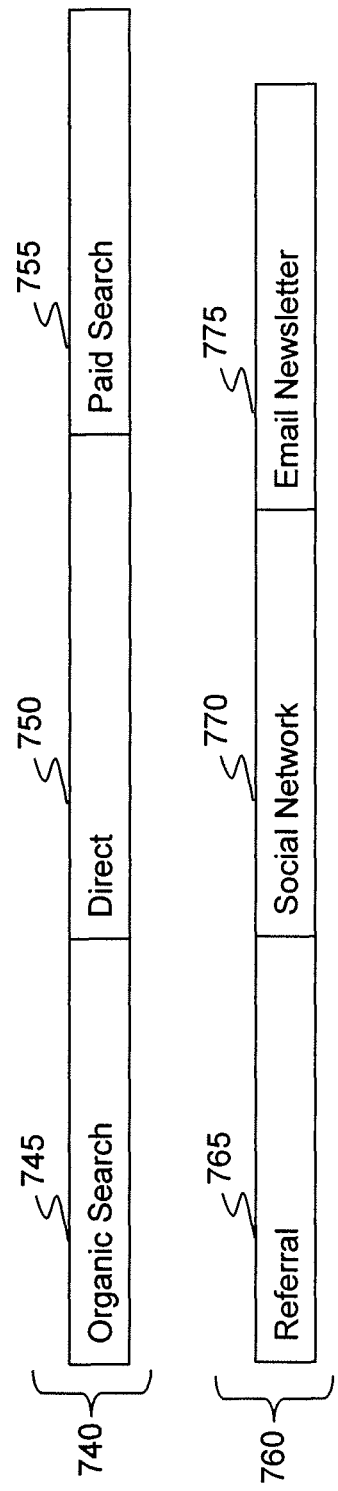
FIG. 7B is a block diagram that illustrates a group path in accordance with an illustrative embodiment.

FIG. 7B is a block diagram that illustrates a group path in accordance with an illustrative embodiment. Conversion paths 740 and 760 correspond to conversion paths 410 and 450, respectively, and can be generated based upon the process 600 as described above. The sorted list of grouping definitions can consist of Organic Search, Paid Search, Referral, Social Network, Email, and Direct groups. The Organic Search group can consist of group rules that include a first rule that matches the source of the user interaction to a string that includes a name of a search engine, such as "search engine 1" and a second rule that matches the medium of the user interaction to the string "organic." The Paid Search rule can include group rules that include a first rule that matches the source of the user interaction to a string that includes a name of a search engine, such as "search engine 2" and a second rule that matches the medium of the user interaction to the string "cpc" (cost per click) or "ppc" (pay per click). A group rule can use wildcards and also have a number of strings that are used to match data of a user interaction. For instance, the Social Network group can consist of group rules that include a first rule that matches the source of the user interaction to any one of "*socialnetwork1*", "*socialnetwork2*", or "*socialnetwork3*". Such a rule would match a number of different source data, such as, but not limited to, "www.socialnetwork1.com", "socialnetwork2.com", or "socialnetwork3.org". The Referral, Direct, and Email groups can include group rules that match the source dimension to "referral", "direct", and "email" respectively. Rules can operate on any dimension of the user interactions, and are not limited to using the source dimension. For example, the country/territory of each user interaction can be used to further differentiate Paid Search as US Paid Search, UK Paid Search, etc. A default rule or a default dimension can be used if a user interaction does not match any of the non-default groups in the sorted list of grouping definitions. For instance, the source and medium dimensions can be combined if there is no matching group. In another embodiment, each of the non-matching user interactions can match a default group that is entitled "Ungrouped." Once the conversion paths are converted into group paths, the group paths can be aggregated and used to generate a report regarding the group paths.

FIG. 8A illustrates a portion of a conversion path report 800 based on aggregated non-group conversion paths as discussed with respect to FIG. 7A. The portion of the report 800 includes three columns corresponding to a non-group conversion path 802, a number of conversions of the particular conversion path 804, and a value of those conversions 806. The portion of the report 800 illustrated aggregates conversion paths for 55,106 different conversions, which can be calculated using the conversions 804 column. Conversion path 700 is aggregated with other similar paths in row 808. Conversion paths that are the same length and have the same source and medium dimensional data can be aggregated together. Row 808 informs a user that there were 16,889 conversions having a total value of $27,058.57. Each of these conversions consisted of three user interactions that had source/medium data of "search engine/organic," "direct/none," and "search engine/cpc," respectively. Conversion path 720 is aggregated with other similar paths in row 810. The number of conversions and the total value of those conversions are also shown in row 810.

Figure 8B:
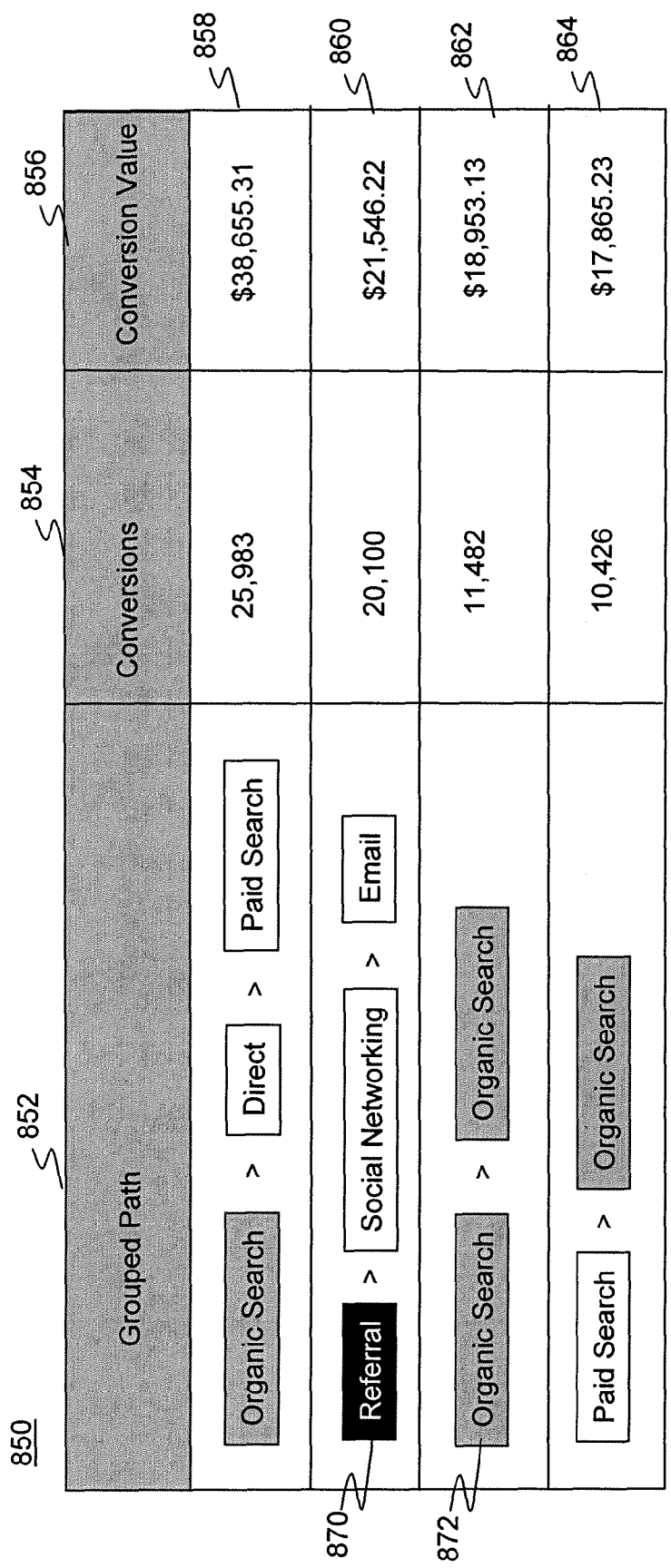
FIG. 8B illustrates portions of a report illustrating group paths in accordance with an illustrative embodiment.

FIG. 8B illustrates a portion of a group path report 850 based on aggregated group paths converted from conversion paths as discussed with respect to FIG. 7B. As discussed above, the group paths illustrated in FIG. 7B were generated from conversion paths using a sorted list of grouping definitions including groups, Organic Search, Paid Search, Referral, Social Network, Email, and Direct. Similar to the portion of the report 800, the portion of the report 850 contains three columns corresponding to group paths 852, a number of conversions of the particular group path 854, and the value of those conversions 856. The data illustrated in FIG. 8B includes all of the data illustrated in FIG. 8A.

Differences between FIGS. 8A and 8B are attributable to grouping user interactions and aggregating the group paths, as illustrated in FIG. 8B. For instance, rows 808 and 812 of FIG. 8A are combined into row 858 of FIG. 8B. The user interactions whose source is "search engine" and whose medium is either "cpc" or "ppc" are grouped into the "Paid Search" group. Grouping of related user interactions and aggregating the group paths allow data to be reported more succinctly. In one embodiment, the rules are user generated and therefore, the user is able to craft rules that provide data at an appropriate or desired scope or granularity. Different sorted lists of grouping definitions can be used to provide different levels of granularity of the same conversion path data. Another example of aggregating group paths is shown in row 860 of FIG. 8B, which is a combination of rows 810 and 814 of FIG. 8A. Row 860 illustrates that 20,100 conversions included a second user interaction at either one of two of the networking sites illustrated in rows 810 and 814 of FIG. 8A (i.e., socialnet_url and socialnet2_url). The Social Networking group allows user interactions with different dimensional data to be grouped together.

A group element can include display information regarding how to display the group element. For example, the display information can include a font color and/or a background color that can be used to display the group name. Group element 872 includes display information to display the group name in black font with a grey background. Various colors can be used. Group element 870 illustrates display information that displays the group name in white text on a black background. The display information can also include, but is not limited to, a font used to display the group name, a shape used to display the group name within, and a border drawn around the shape. In one embodiment, the display information can be encoded in embedded instructions and cascading style sheets (css) to render each group name appropriately. In this embodiment, css rules are named based on a hashing algorithm. The hashing algorithm can take the group name as input and the output can be formatted in appropriate css syntax. Embedded instructions can be used to dynamically insert the css into output data. Such dynamic insertion allows background processes to avoid having to process the display information of various groups.

In one embodiment, the advertiser can create the various group rules and the order of the groups used to generate the group paths. For example, the advertiser can create and/or edit group rules using a web based interface. The sorted list of grouping definitions can be saved for future use. In addition, an advertiser can save multiple different sorted lists of grouping definitions. Labels can be attached to each sorted list of grouping definitions to differentiate the lists. The user interface can also allow an advertiser to modify or delete an existing sorted list of grouping definitions. For example, in one embodiment, the order of the groups can be rearranged by dragging a particular group and dropping the group in a new position in the sorted list. In addition, the advertiser can select a sorted list of grouping definitions to generate a report that includes group paths created from an advertiser's conversion paths based upon the selected sorted list of grouping definitions.

When data relating to group paths is requested, the group paths can be generated by the performance analysis apparatus 120. Alternatively, the conversion paths can be converted to group paths at any point along the transmission of the conversion path data from a data source, such as the historical data store 119, to a user, such as at the user's browser. In another embodiment, the conversion path data is requested by and returned to a web server based upon a request from a user. The web server can convert the conversion paths into group paths and then transmit a report or data including the group paths to the user. In yet another embodiment, the conversion path data can be sent to a user. The sorted list of grouping definitions, including all of the group rules, can also be sent to the user. Instructions to convert the conversion paths to the group paths can also be sent to the user and used to convert the conversion paths into group paths. For example, the conversion path data, group rules, and embedded instructions to convert conversion paths into group paths can be sent to a user's browser, which can execute the embedded instructions code to convert the conversion paths into group paths. The instructions can also include instructions or code that can format and display the group paths.

In another embodiment, the group paths are used to create Venn-like diagrams. In one embodiment, different channel groups are shown in a Venn-like diagram. Using groups as described above, channels can be defined based upon a sorted list of channel groups. Channel groups include grouping rules to group user interactions based upon the source and medium dimensions. Channel groups can include Paid Advertising, Direct, Organic Search, Referral, Email, Social Network, Feed, and Other. Groups such as Referral, Feed, and Email can include group rules based upon the medium dimension. For instance, if a user interaction has a medium dimension set to "email" the user interaction would be grouped as Email. Paid Advertising, Direct, and Organic Search can be implemented with group rules that rely upon both the source and medium dimensions. The Social Network group can be defined to match user interactions whose source matches a list of known social networking sites. As described above, this list may include wildcards used to match against source dimensional data. The rule "other" can be defined as the default group that matches any user interaction that does not match any of the other groups.

Advertisers often advertise across multiple channels. The impact of cross-channel advertising can be difficult to discern. A Venn-like diagram can be used to illustrate the relative overlap of conversion paths across different channels. Unlike a traditional Venn diagram that is limited to accurately showing three or fewer circles, the Venn-like diagrams can illustrate four or more circles associated with different channel groups. In one embodiment, the Venn-like diagram can include eight different circles, one for each channel group. When more than three circles are illustrated in a single Venn-like diagram, the overlap areas theoretically cannot be completely accurate in all situations. For instance, some possible overlap areas cannot be visualized. However, even when a possible overlap cannot be accurately displayed, the accuracy of the overlap areas can be maximized in the Venn-like diagram.

Even with these theoretical limitations, the Venn-like diagrams can provide useful and relatively accurate information. For instance, the size of each circle is proportional to the percentage of conversions that include at least one user interaction that is grouped in the corresponding channel. In addition, a hill-climbing algorithm can be applied to create a relatively accurate representation of the overlap of the visualized channels.

Figure 9:
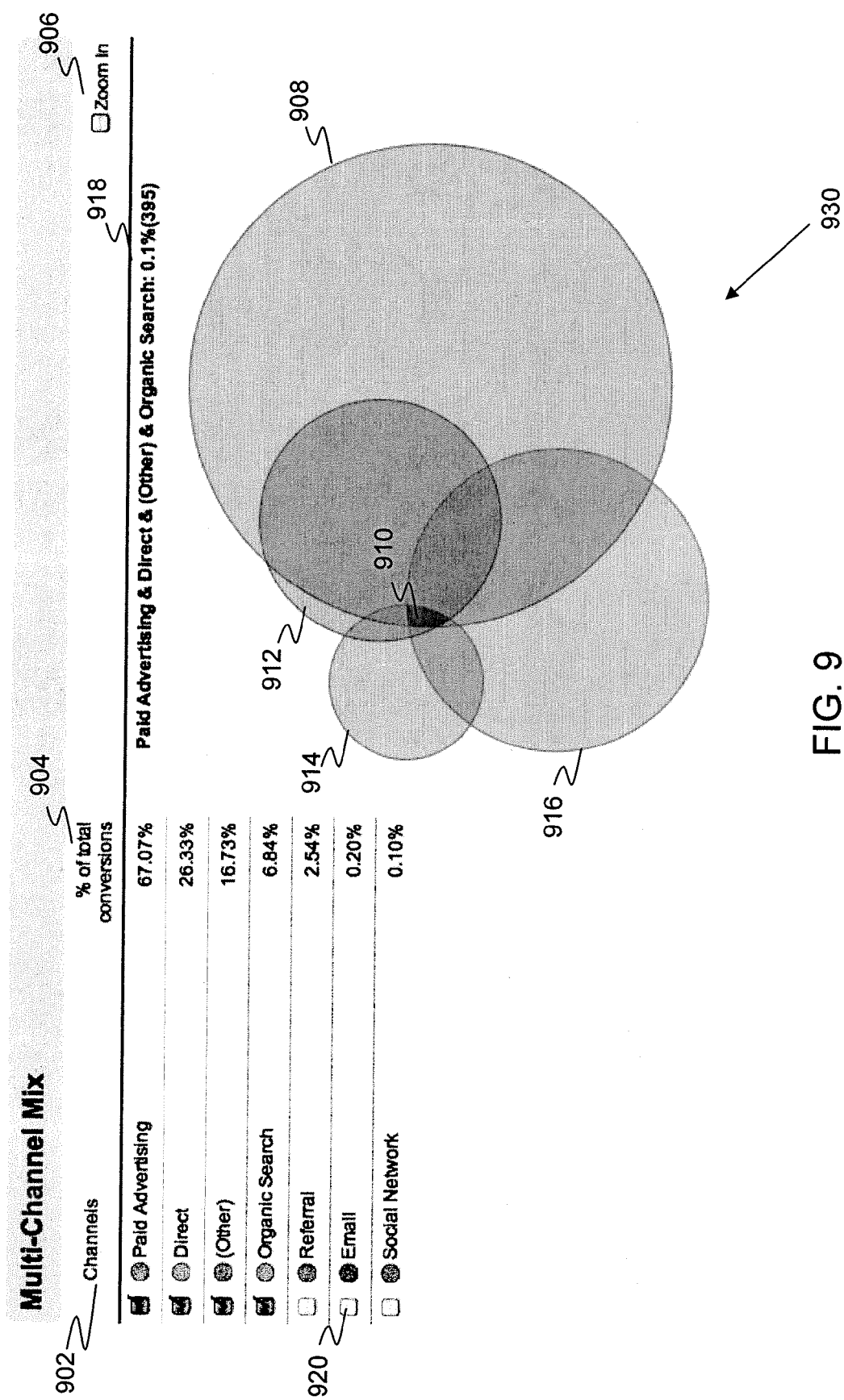
FIG. 9 illustrate a Venn-like diagram of four selected channels in accordance with an illustrative embodiment.

FIG. 9 illustrates a Venn-like diagram of four selected channels in accordance with an illustrative embodiment. The channels 902 that are included in at least one conversion path are shown, along with the total percentage of conversion paths 904 that include at least one user interaction that is grouped into the respective channel. Each channel can be selected for inclusion in the Venn-like diagram 930. For example, checkbox 920 can be selected to add the Email channel to the Venn-like diagram 930. Similarly, checkboxes can be used to remove a channel from the Venn-like diagram 930. If no channel is selected, or if the selected channels do not overlap, no Venn-like diagram is displayed. Instead, an indication that there is no selected channel or no overlap between the selected channels can be displayed. In an alternative embodiment, if the selected channels do not overlap, disjoint proportionally sized circles are generated. A text area 918 can be used to illustrate the total number and percentage of conversion paths that include user interactions from each of the selected channels. In the Venn-like diagram 930, circle 908 corresponds to the "Paid Advertising" channel, circle 916 corresponds to the "Direct channel", circle 912 corresponds to the "Other" channel, and circle 914 to the "Organic Search" channel. The size of each of these circles is proportional to the data in column 904. Region 910 illustrates the total overlap of all four selected channels, and the size of the region 910 is proportional to the percentage of conversions associated with the 395 conversions that included a user interaction from each of the selected channels.

In another embodiment, data populating column 904 is based upon conversion paths that include the highest priority user interaction. For instance, a conversion path that includes both a Paid Advertising user interaction and a Referral interaction would be part of the Paid Advertising percentage, if the Paid Advertising channel is higher in priority compared to Referral. Therefore, each conversion path is included in the highest ranking channel for the purpose of calculating the data in column 904. Such a calculation would result in the data in column 904 adding to 100%. The Venn-like diagram 930, however, would continue to illustrate the various overlap of the channels as described above.

In one embodiment, the Venn-like diagram 930 can be interactive. As a cursor moves over any circle or overlap region of the Venn-like diagram 930, additional information associated with channel data can be displayed. For instance, if the cursor is moved over region 910, a pop up window or an overlay can be displayed that provides information regarding the total number of conversions for each channel that is represented in the region 910, the channels represented in the region 910, and the number of conversions that are represented in the region 910. In one embodiment, the channel information and conversion data can be sent to a client device. As a cursor of the client device is positioned over any region of the Venn-like diagram 930, the channel information and conversion data associated with the region can be referenced and displayed to a user. In another embodiment, the channel information and conversion data can be stored remotely and accessed when a cursor is positioned over an associated region.

As the number of channels that are selected increases, the number of conversion paths that include user interactions from each of the selected channels is likely to become smaller. It is possible that the number becomes sufficiently small that the area of the innermost overlap region, region 910 in FIG. 9, becomes difficult to visualize. If the area of the innermost region is below a defined threshold value, a zoom option is provided that allows the innermost region to be illustrated with sufficient detail. In one embodiment, the zoom option is enabled if the area of the innermost region is less than a certain number of pixels or is less than a certain percentage of the diagram area. For example, if the innermost region comprises less than 100 pixels or is less than 3% of the area of the diagram, the zoom option can be enabled. The zoom option can be selected using a button or check box, such as checkbox 906. When selected, the region of the Venn-like diagram around the innermost region is magnified, such that the size and shape of the innermost region is clearly visible. In one embodiment, when the zoom option is selected, an animation effect is used to visualize the zooming process. A corresponding animation can also be used when the user de-selects the zoom option to view the entire Venn-like diagram, or to view the Venn-like diagram in the original format.

Figure 10:
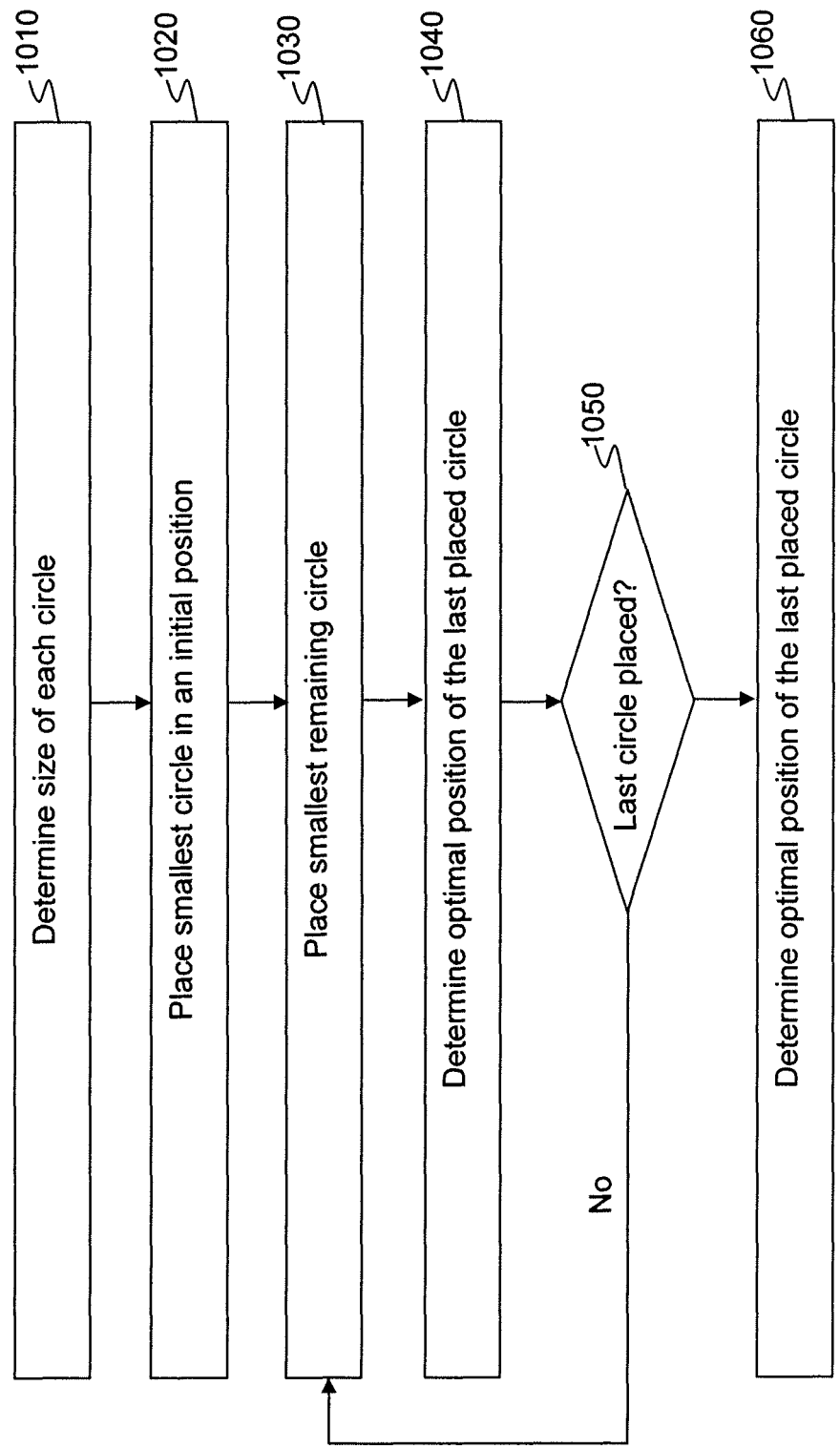
FIG. 10 is a flow diagram of a process for generating a Venn-like diagram in accordance with an illustrative embodiment.

FIG. 10 is a flow diagram of a process for generating a Venn-like diagram in accordance with an illustrative embodiment. The Venn-like diagram will include a circle for each selected channel. The size of each circle is determined based upon the number of conversion paths that include at least one user interaction that is grouped into the respective channel (1010). For instance, in one embodiment, the size of a circle is a factor of the percentage of conversions that include one or more user interactions grouped into the respective channel. To generate the Venn-like diagram, the smallest circle is placed in an initial position (1020). In one embodiment, the initial position is determined such that the center of the smallest circle is centered vertically in the diagram. In addition, the smallest circle is placed such that it is tangent to a selected edge of the diagram. In an alternative configuration, a buffer is added between the selected edge of the diagram and the smallest circle to offset the position of the smallest circle relative to the selected edge of the diagram. The next smallest circle from the remaining circles is then placed in the diagram (1030). In one embodiment, an added circle is randomly placed such that the added circle overlaps each previously placed circle.

Once added, the added circle's location is optimized (1040). In one embodiment, a hill-climbing algorithm is used to determine an optimized location for the last added circle. In one embodiment, after a circle is initially placed to overlap each of the previously added circles, the area of each overlap area is calculated. The areas of the overlap are then input into a target function. The last added circle is then randomly moved to a new location that is in close proximity to the previous location. The next location is such that the added circle still overlaps each of the previously added circles. The area of each overlap is again calculated and input into the target function. If the target function produces a more optimal result at the new location, the circle's position is updated. Depending on the target function used, a lesser or greater value determines if the new position is more optimal. The moving and recalculating of the target function repeats until an optimal location is found.

In one embodiment, the target function is:

$$f = \left(\log \frac{area_{intersection\ of\ all\ n\ circles}}{area_{intersection\ of\ all\ n\ channels}}\right)^2 + \ldots + \left(\log \frac{area_{intersection\ of\ all\ n-1\ circles}}{area_{intersection\ of\ all\ n-1\ channels}}\right)^2.$$

This function calculates a value based upon the ratio of the actual overlap area of all of the circles to the ideal overlap. The ideal overlap values can be calculated based upon data from the conversion paths. As the last added circle is moved to a new location, this target function is minimized to find the optimal location of a circle. The minimized value represents the smallest error in the overlap areas with the ideal overlap areas. Other target functions can be used. Some target functions can weight a particular region more than other regions, such that the weight factors into how accurately any particular area is illustrated. For instance, in one embodiment the area of overlap of all circles is weighted more heavily than other overlap areas. Such a target function can result in Venn-like diagrams that are more accurate in illustrating the overlap of all circles. This increase in accuracy, however, comes at the cost of potentially less accuracy for the other overlap regions.

In another embodiment, the target function can be:

$$f = \sum_{S \in\ all\ formed\ regions} \left(\log \frac{area_s + .0001}{targetarea_s + .0001}\right)^2.$$

In this target function, $area_s$ is the area of an overlap region calculated based upon the placed circles and $targetarea_s$ is the ideal area calculated from conversion path data. The ratio, as shown above, of the $area_s$ to the $targetarea_s$ is summed for each region for the placement of the various circles. The hill climbing algorithm minimizes the value of this function to find a circle's optimal position.

Figure 11:
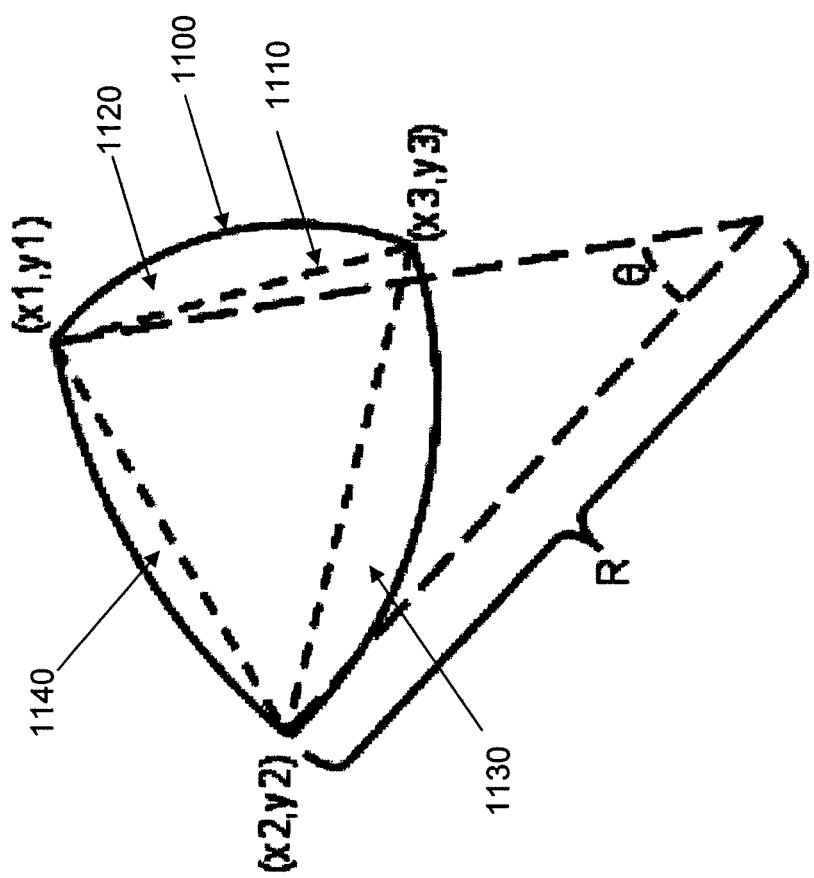
FIG. 11 illustrates a circular polygon and variables that can be used to calculate the area of the circular polygon in accordance with an illustrative embodiment.

FIG. 11 illustrates a circular polygon and variables that can be used to calculate the area of the circular polygon in accordance with an illustrative embodiment. The circular polygon 1100 is analogous to the area of the intersection of three circles. The coordinates of the circular polygon 1100 relate to the intersection of the added circles, which can be calculated using well known geometric methods. Determining which of the intersections of the added circles are part of the circular polygon 1100 is described in greater detail below. The area of the circular polygon 1100 can be determined as the sum of two components. The first is the area of an underlying polygon 1110, formed by the dotted line segments. The area of the polygon 1110 can be found using the formula:

$$A = \frac{1}{2}(x_1 y_2 - x_2 y_1 + x_2 y_3 - x_3 y_2 + \ldots + x_n y_1 - x_1 y_n).$$

Added to the area of the polygon are the areas of circular segments 1120, 1130, and 1140. The area of the circular segment 1140 can be calculated by:

$$B = \frac{1}{2}R^2(\theta - \sin\theta).$$

The areas of the circular segments 1120 and 1130 can be calculated in a similar manner. The area of the circular polygon is are of the polygon 1100 plus the area of each circular segment 1120, 1130, and 1140.

Once the optimal location is found, if any circles have not been added to the diagram, the next smallest circle is added and its optimal position is determined (1050). This continues until each circle has been added to the diagram and its optimal position determined. After the position of each circle is optimized, an image can be generated based upon the optimal positions of the circles (1060).

Each circle can have an associated color that fills the circle when shown in the Venn-like diagram. Each circle can be transparent to some degree, such that overlap regions are darker than the individual circles. The darkest region is the region where all of the circles overlap. In one embodiment, the area of overlap of all of the circles is further increased in darkness or some other visual indication is added to highlight this area. To darken the area, the area must be determined. In one embodiment, circular polygons can be used to determine this area.

A circular polygon is a plane region that is bounded by a closed path that is composed of a sequence of circle segments. A circle segment can be represented by the coordinates of a circle, the radius of the circle, a beginning angle, and an end angle. In one embodiment, once the optimal positions of the various circles have been determined, the inner most circle polygon can be determined. The circular polygon can be determined by calculating the intersection of each of the circles.

Figure 12B:
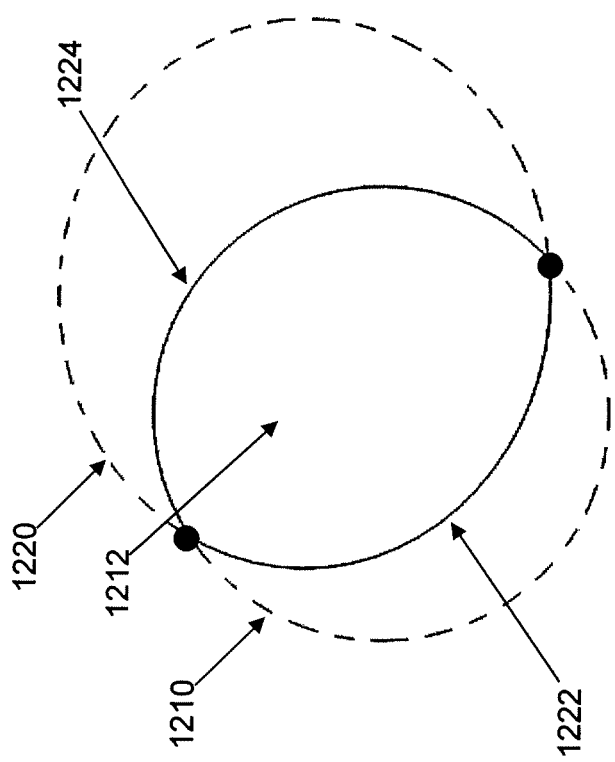
FIG. 12B illustrates a circular polygon based upon the intersection of two circles in accordance with an illustrative embodiment.
Figure 12A:
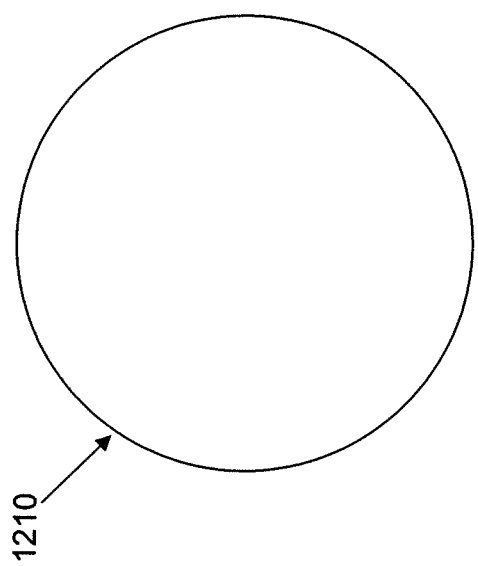
FIG. 12A illustrates a circular polygon comprising a single circle in accordance with an illustrative embodiment.

FIG. 12A illustrates a circular polygon comprising a single circle in accordance with an illustrative embodiment. A first circle 1210 is selected and the first circle 1210 is considered to be the circular polygon. That is, the circular polygon consists of a single circle segment having a center and radius of the first circle and beginning and ending angles to indicate 360 degrees. FIG. 12B illustrates a circular polygon based upon the intersection of two circles in accordance with an illustrative embodiment. One of the remaining circles 1220 is selected. The intersection of the two circles is calculated using well known geometric methods. Once the interactions are determined, the circle polygon 1212 will have two circle segments 1222 and 1224, one for each circle.

Figure 12C:
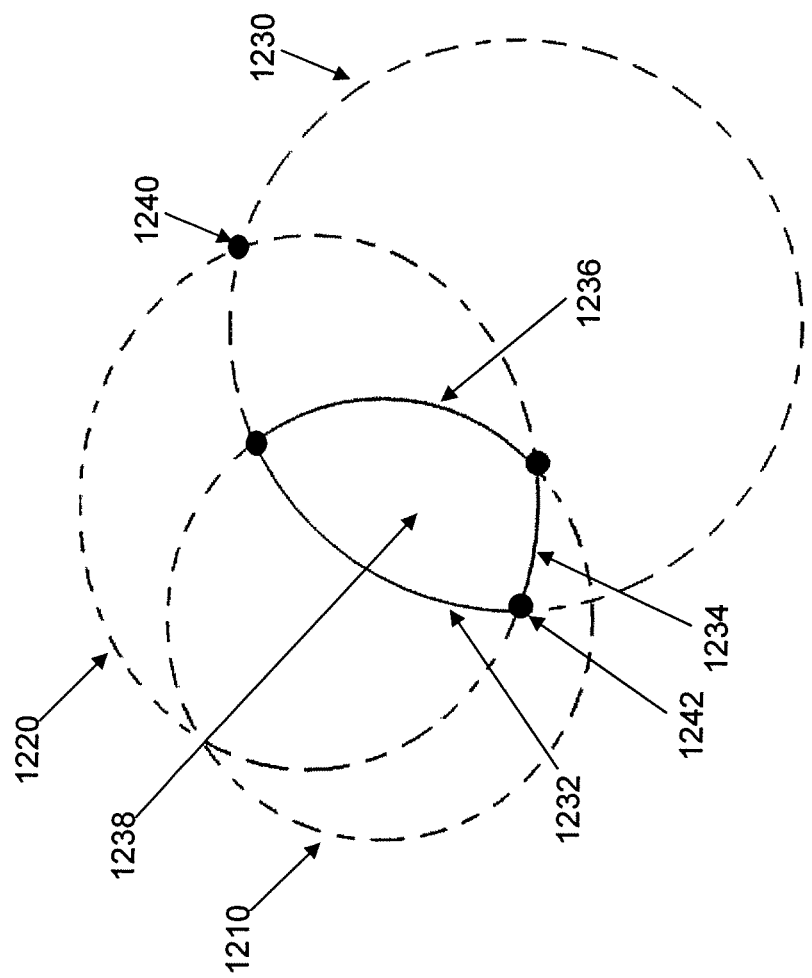
FIG. 12C illustrates a circular polygon based upon the intersection of three circles in accordance with an illustrative embodiment.

FIG. 12C illustrates a circular polygon based upon the intersection of three circles in accordance with an illustrative embodiment. A third circle 1230 is selected and the intersections of the third circle with the first and second circle are calculated. After two circles have been added, each additional circle requires further analysis since the circular polygon 1238 will not contain every intersection of the various circles. To determine the coordinates of the circular polygon 1238, the previous circular polygon 1212 from FIG. 12B is used. The third circle will intersect each of the previous two circles in two points. One such point will be part of the circular polygon 1238. Circle 1230 intersects circle 1220 at two points, 1240 and 1242. The point that will be part of the circular polygon 1238 is the point that lays upon the circle segment 1222 of FIG. 2B which is based upon circle 1220. This process is done for the intersections of circles 1230 and 1210. After which, the circle polygon 1238 will consist of three circle segments. The process of adding circles and determining the circle polygon continues until all of the circles have been processed. To clearly highlight the innermost circular polygon, the area of the innermost circular polygon can be darkened. Using the circle segments of the innermost circular polygon, the area to darkened can be calculated.

In another embodiment, the innermost circular polygon can be determined by selecting any intersection of the innermost circular polygon. Using the known properties of the circles in the diagram, the innermost arc is determined from all of the arcs from that point. Following the edge of the selected arc leads to another intersection point of the innermost circular polygon. The innermost arc is again calculated and the arc is traversed to find another intersection point of the innermost circular polygon. The process continues until an arc leads back to the starting intersection point. Upon returning to the starting intersection point, each intersection point of the innermost circular polygon has been found and the corresponding area can be darkened appropriately. Once the Venn-like diagram is complete, instructions to display the Venn-like diagram can be constructed. The instructions can be sent to a user to display the Venn-like diagram. The generation of the Venn-like diagram can be accomplished on any computing device such as the performance analysis apparatus 120, advertising management system 110, web server, etc.

The advertisement management system 110 and/or the performance analysis apparatus 120 can be realized by instructions that upon execution cause one or more processing devices to carry out the processes and functions described above. Such instructions can comprise, for example, interpreted instructions, such as script instructions, executable code, or other instructions stored in a computer-readable medium. The advertisement management system 110 and/or the performance analysis apparatus 120 can be distributively implemented over a network, such as a server farm, or can be implemented in a single computer device.

Figure 13:
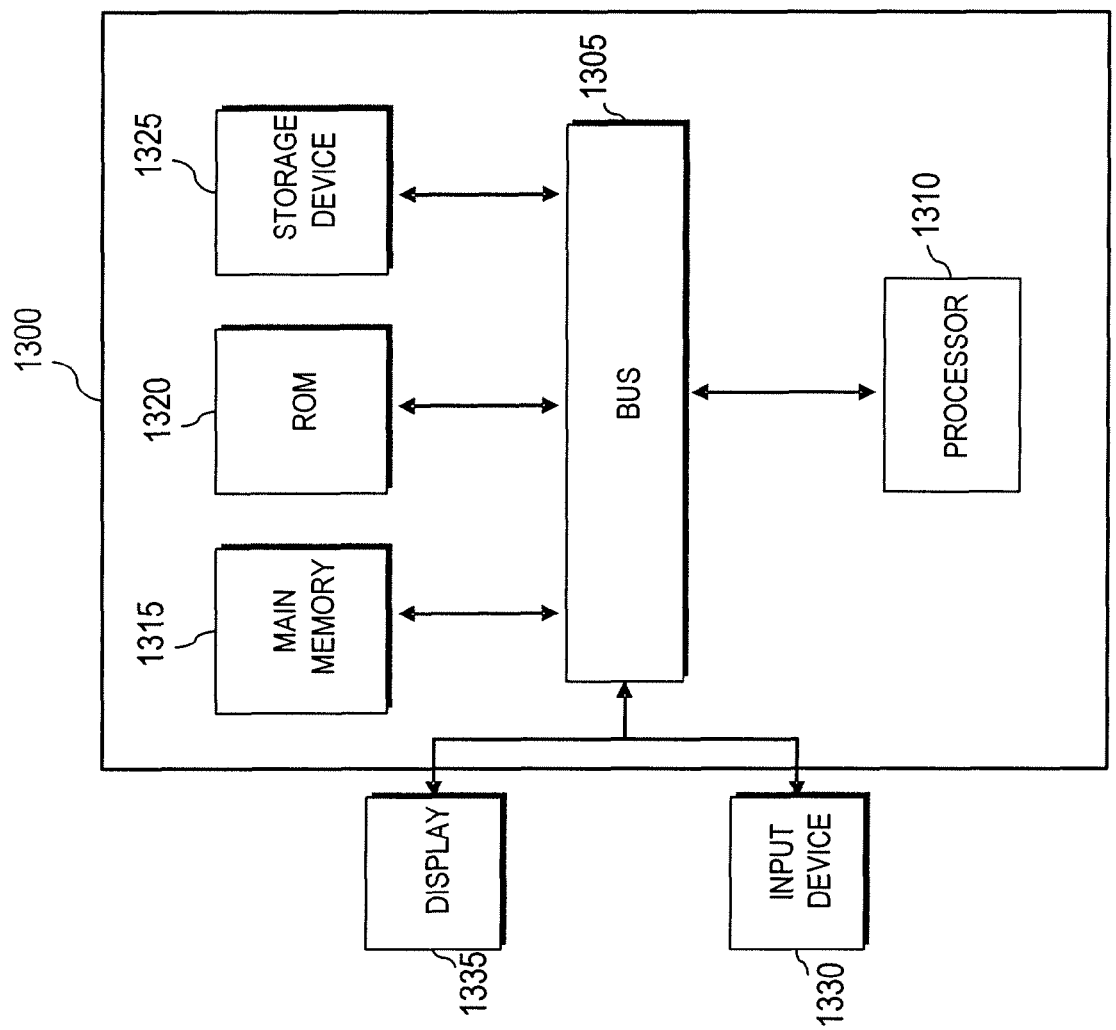
FIG. 13 is a block diagram of a computer system in accordance with an illustrative embodiment.

FIG. 13 illustrates a depiction of a computer system 1300 that can be used to provide user interaction reports, process log files, implement an illustrative performance analysis apparatus 130, or implement an illustrative advertisement management system 110. The computing system 1300 includes a bus 1305 or other communication component for communicating information and a processor 1310 coupled to the bus 1305 for processing information. The computing system 1300 also includes main memory 1315, such as a random access memory (RAM) or other dynamic storage device, coupled to the bus 1305 for storing information, and instructions to be executed by the processor 1310. Main memory 1315 can also be used for storing position information, temporary variables, or other intermediate information during execution of instructions by the processor 1310. The computing system 1300 may further include a read only memory (ROM) 1310 or other static storage device coupled to the bus 1305 for storing static information and instructions for the processor 1310. A storage device 1325, such as a solid state device, magnetic disk or optical disk, is coupled to the bus 1305 for persistently storing information and instructions.

The computing system 1300 may be coupled via the bus 1305 to a display 1335, such as a liquid crystal display, or active matrix display, for displaying information to a user. An input device 1330, such as a keyboard including alphanumeric and other keys, may be coupled to the bus 1305 for communicating information, and command selections to the processor 1310. In another embodiment, the input device 1330 has a touch screen display 1335. The input device 1330 can include a cursor control, such as a mouse, a trackball, or cursor direction keys, for communicating direction information and command selections to the processor 1310 and for controlling cursor movement on the display 1335.

According to various embodiments, the processes that effectuate illustrative embodiments that are described herein can be implemented by the computing system 1300 in response to the processor 1310 executing an arrangement of instructions contained in main memory 1315. Such instructions can be read into main memory 1315 from another computer-readable medium, such as the storage device 1325. Execution of the arrangement of instructions contained in main memory 1315 causes the computing system 1300 to perform the illustrative processes described herein. One or more processors in a multi-processing arrangement may also be employed to execute the instructions contained in main memory 1315. In alternative embodiments, hard-wired circuitry may be used in place of or in combination with software instructions to implement illustrative embodiments. Thus, embodiments are not limited to any specific combination of hardware circuitry and software.

Although an example processing system has been described in FIG. 13, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of providing data related to conversion paths, the method comprising:
   receiving information regarding a plurality of conversion paths, wherein each conversion path comprises one or more user interactions, wherein a user interaction of the one or more user interactions comprises a plurality of dimensional data that are associated with the user interaction, wherein each conversion path corresponds to a single user, and wherein each conversion path ends with a conversion interaction;
   receiving a sorted list of channel groups, wherein each channel group defines a set for one or more user interactions, wherein each channel group comprises one or more group rules, and wherein each channel group comprises a group name;
   determining, using a processor, a channel group for each user interaction of each conversion path of the plurality of conversion paths based on the one or more group rules of each channel group of the sorted list of channel groups and the dimensional data associated with the user interaction;
   determining, using the processor, for each channel group, a number of conversion paths that include one or more user interactions that are determined for the channel group;
   receiving a selection of channels to visualize, wherein each channel of the selected channels is associated with a channel group; and
   generating an image comprising a plurality of circles, wherein each circle is associated with a selected channel, wherein all of the plurality of circles overlap, wherein an area of each circle is proportional to a channel percentage based on the number of conversion paths that include one or more user interactions that are determined for the channel group and a total number of the plurality of conversion paths, and wherein an area of overlap of all of the circles is proportional to an overlap percentage based on a number of conversion paths that include at least one user interaction having a determined channel group for each selected channel.

2. The method of claim 1, wherein the image comprises three circles.

3. The method of claim 1, wherein the image comprises four circles.

4. The method of claim 1, wherein the image comprises between four and eight circles.

5. The method of claim 1, further comprising providing instructions to display the generated image.

6. The method of claim 1, further comprising:
   determining the area of overlap of all circles is below a predetermined threshold;
   enabling a zoom-in mode that magnifies the area of overlap of all circles based upon the determining the area of overlap of all circles is below a predetermined threshold;
   receiving a zoom-in request; and
   generating a magnified image that illustrates the area of overlap of all circles.

7. The method of claim 1, wherein generating an image comprising a plurality of circles comprises using a hill-climbing algorithm to determine optimal positions of the plurality of circles.

8. The method of claim 7, wherein the optimal positions of the plurality of circles maximizes the accuracy of each overlap area of the plurality of circles based upon a number of conversion paths that include user interactions of each channel corresponding to each overlap area.

9. A system comprising:
   one or more processors configured to:
      receive information regarding a plurality of conversion paths, wherein each conversion path comprises one or more user interactions, wherein a user interaction of the one or more user interactions comprises a plurality of dimensional data that are associated with the user interaction, wherein each conversion path corresponds to a single user, and wherein each conversion path ends with a conversion interaction;
      receive a sorted list of channel groups, wherein each channel group defines a set for one or more user interactions, wherein each channel group comprises one or more group rules, and wherein each channel group comprises a group name;
      determine a channel group for each user interaction of each conversion path of the plurality of conversion paths based on the one or more group rules of each channel group of the sorted list of channel groups and the dimensional data associated with the user interaction;
      determine for each channel group, a number of conversion paths that include one or more user interactions that are determined for the channel group;
      receive a selection of channels to visualize, wherein each channel of the selected channels is associated with a channel group;
      generate an image comprising a plurality of circles, wherein each circle is associated with a selected channel, wherein an area of each circle is proportional to a channel percentage based on the number of conversion paths that include one or more user interactions that are determined for the channel group and a total number of the plurality of conversion paths, and wherein an area of overlap of all of the circles is proportional to an overlap percentage based on a number of conversion paths that include at least one user interaction having a determined channel group for each selected channel.

10. The system of claim 9, wherein the image comprises four circles.

11. The system of claim 9, wherein the image comprises between four and eight circles.

12. The system of claim 9, wherein the processor is further configured to provide instructions to display the generated image.

13. The system of claim 9, wherein the processor is further configured to:
   determine the area of overlap of all circles is below a predetermined threshold;
   enable a zoom-in mode that magnifies the area of overlap of all circles based upon the determining the area of overlap of all circles is below a predetermined threshold;
   receive a zoom-in request; and
   generate a magnified image that illustrates the area of overlap of all circles.

14. The system of claim 9, wherein the processor is further configured to determine optimal positions of the plurality of circles using a hill-climbing algorithm.

15. The system of claim 14, wherein the optimal positions of the plurality of circles maximizes the accuracy of each overlap area of the plurality of circles based upon a number of conversion paths that include user interactions of each channel corresponding to each overlap area.

16. A non-transitory tangible computer-readable medium having instructions stored thereon, the instructions comprising:
   instructions to receive information regarding a plurality of conversion paths, wherein each conversion path comprises one or more user interactions, wherein a user interaction of the one or more user interactions comprises a plurality of dimensional data that are associated with the user interaction, wherein each conversion path corresponds to a single user, and wherein each conversion path ends with a conversion interaction;
   instructions to receive a sorted list of channel groups, wherein each channel group defines a set for one or more user interactions, wherein each channel group comprises one or more group rules, and wherein each channel group comprises a group name;
   instructions to determine a channel group for each user interaction of each conversion path of the plurality of conversion paths based on the one or more group rules of each channel group of the sorted list of channel groups and the dimensional data associated with the user interaction;
   instructions to determine for each channel group, a number of conversion paths that include one or more user interactions that are determined for the channel group;
   instructions to receive a selection of channels to visualize, wherein each channel of the selected channels is associated with a channel group;
   instructions to generate an image comprising a plurality of circles, wherein each circle is associated with a selected channel, wherein an area of each circle is proportional to a channel percentage based on the number of conversion paths that include one or more user interactions that are determined for the channel group and a total number of the plurality of conversion paths, and wherein an area of overlap of all of the circles is proportional to an overlap percentage based on a number of conversion paths that include at least one user interaction having a determined channel group for each selected channel.

17. The non-transitory tangible computer-readable medium of claim 16, wherein the image comprises four circles.

18. The non-transitory tangible computer-readable medium of claim 16, further comprising instructions to:
   instructions to determine the area of overlap of all circles is below a predetermined threshold;
   instructions to enable a zoom-in mode that magnifies the area of overlap of all circles based upon the determining the area of overlap of all circles is below a predetermined threshold; and
   instructions to generate a magnified image that illustrates the area of overlap of all circles.

19. The non-transitory tangible computer-readable medium of claim 16, further comprising instructions to determine positions of the plurality of circles using a hill-climbing algorithm.

20. The non-transitory tangible computer-readable medium of claim 19, wherein the optimal positions of the plurality of circles maximizes the accuracy of each overlap area of the plurality of circles based upon a number of conversion paths that include user interactions of each channel corresponding to each overlap area.

* * * * *